United States Patent [19]

Kocan et al.

[11] Patent Number: 4,651,316

[45] Date of Patent: Mar. 17, 1987

[54] DATA LINK EXTENSION FOR DATA COMMUNICATION NETWORKS

[75] Inventors: Kristin F. Kocan, Chicago; George H. Simmons, Naperville, both of Ill.

[73] Assignee: AT&T Bell Laboratories, Murray Hill, N.J.

[21] Appl. No.: 512,388

[22] Filed: Jul. 11, 1983

[51] Int. Cl.[4] ............................ H04J 3/02; H04B 9/00
[52] U.S. Cl. ...................................... 370/85; 455/607; 455/612
[58] Field of Search ................ 455/612, 606, 607, 608; 370/84, 85; 364/200, 900

[56] References Cited

U.S. PATENT DOCUMENTS

| | | | |
|---|---|---|---|
| 4,063,220 | 12/1977 | Metcalfe et al. | 370/93 |
| 4,099,024 | 7/1978 | Boggs et al. | 370/85 |
| 4,127,896 | 11/1978 | Raslavsky, III | 364/200 |
| 4,350,973 | 9/1982 | Petryk, Jr. | 340/347 DD |
| 4,396,978 | 8/1983 | Hammer et al. | 364/200 |
| 4,510,599 | 8/1985 | Ulug | 370/85 |
| 4,525,832 | 6/1985 | Miyao | 370/85 |

OTHER PUBLICATIONS

Harvey J. Hindin, "Roundup: Fiber-Optic Links Specialize", *Electronics,* 27 Jan. 1981, pp. 149-151.
H. S. Al-Khatib and J. A. Howard, "The Extended Ethernet: EE-Net", *Proceedings on Distributed Computing of the 21st IEEE Computer Soc'y Int'l Conference,* Washington, D. C., Sep. 23-25, 1980, pp. 261-267.
E. G. Rawson, R. M. Metcalfe, and R. E. Norton, "Application of Fiber Optics to High-Speed Local Computer Networks", *Proceedings of the 1978 IEEE Int'l Symposium on Circuits and Systems,* New York, N.Y., May 17-19, 1978, pp. 30-34.
E. G. Rawson and R. M. Metcalfe, "Fibernet: Multimode Optical Fibers for Local Computer Networks", *IEEE Transactions on Communications,* vol. Com-26, No. 7, Jul. 7, 1978, pp. 983-990.
A. S. Acampora et al., "A Centralized-Bus Architecture for Local Area Networks", *IEEE International Conference on Communications Conference Record,* Boston, Massachusetts, (Jun. 19-22, 1983), pp. 932-938.
J. Estrin et al., "Gateways Promise to Link Local Networks into Hybrid Systems", *Electronics International,* vol. 55, No. 19, (Sep. 1982). pp. 145-150.
E. G. Rawson, "Application of Fiber Optics to Local Networks", *Proceedings of the Local Area Communications Network Symposium,* Boston, MA, May 1979, pp. 155-167.

*Primary Examiner*—Joseph A. Orsino, Jr.
*Attorney, Agent, or Firm*—David Volejnicek

[57] ABSTRACT

In a data communication network (100) wherein using units (104-111) contend for access to the network communication bus (160), data links (101-103) interface using units located remotely from the bus to the bus for communication such that the distances between the using units and the bus are rendered functionally transparent from the viewpoint of the bus. A data link (102) includes a network interface circuit (117) connected to and located near the using unit (108) for buffering communications passing between the using unit and the bus, a data transfer controller circuit (151) connected to and located near the bus for communicating on the bus on behalf of the using unit according to the communication protocol of the bus, a local fiber optic extension circuit (141) connected to and located near the data transfer controller circuit for emulating thereto the network interface circuit, a remote fiber optic extension circuit (125) connected to and located near the network interface circuit for emulating thereto the data transfer controller circuit, and an optical fiber link (131) connecting the fiber optic extension circuits.

33 Claims, 27 Drawing Figures

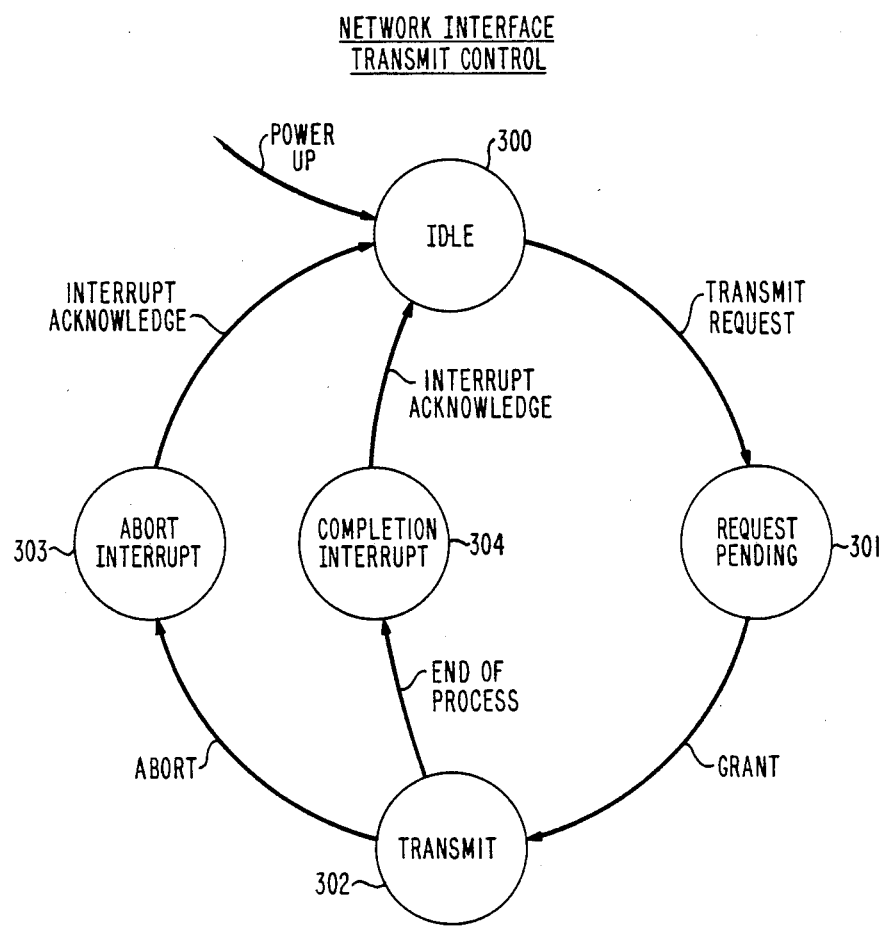

NETWORK INTERFACE
TRANSMIT CONTROL

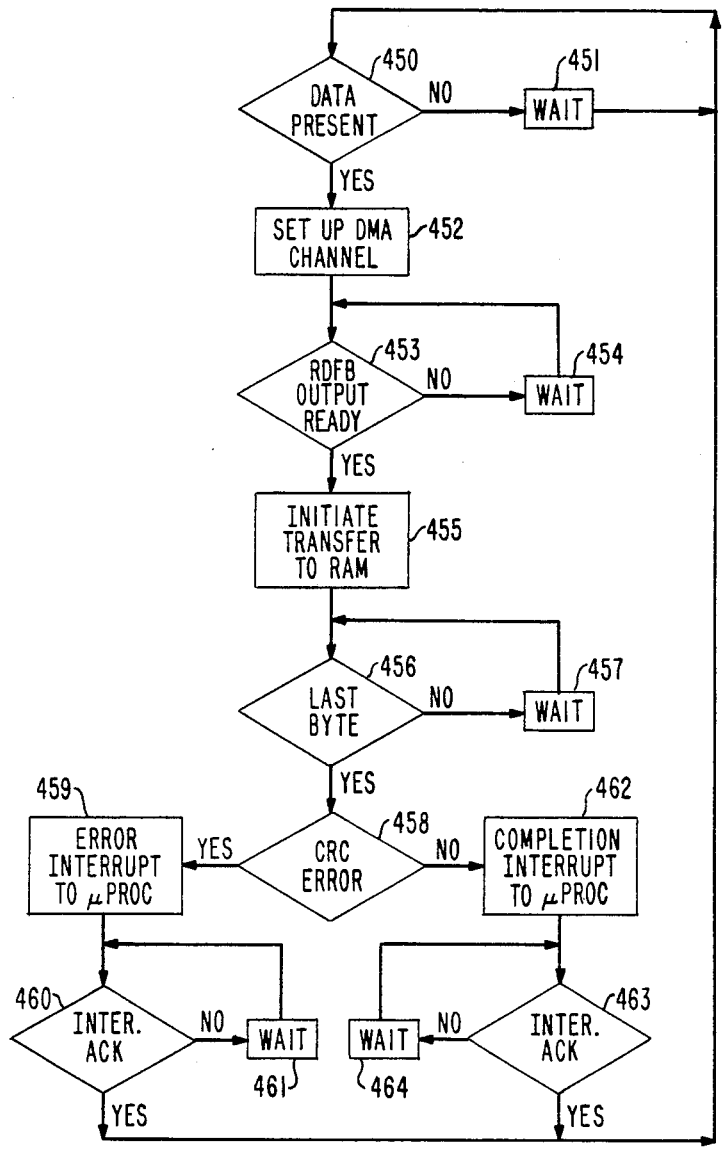

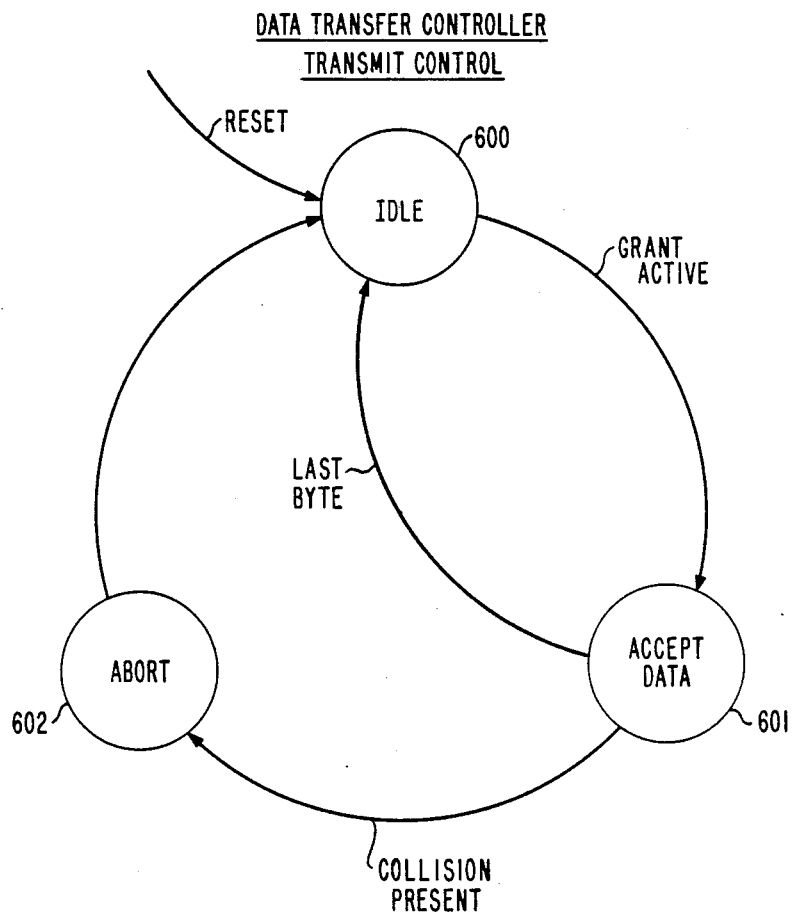

DATA TRANSFER CONTROLLER TRANSMIT CONTROL

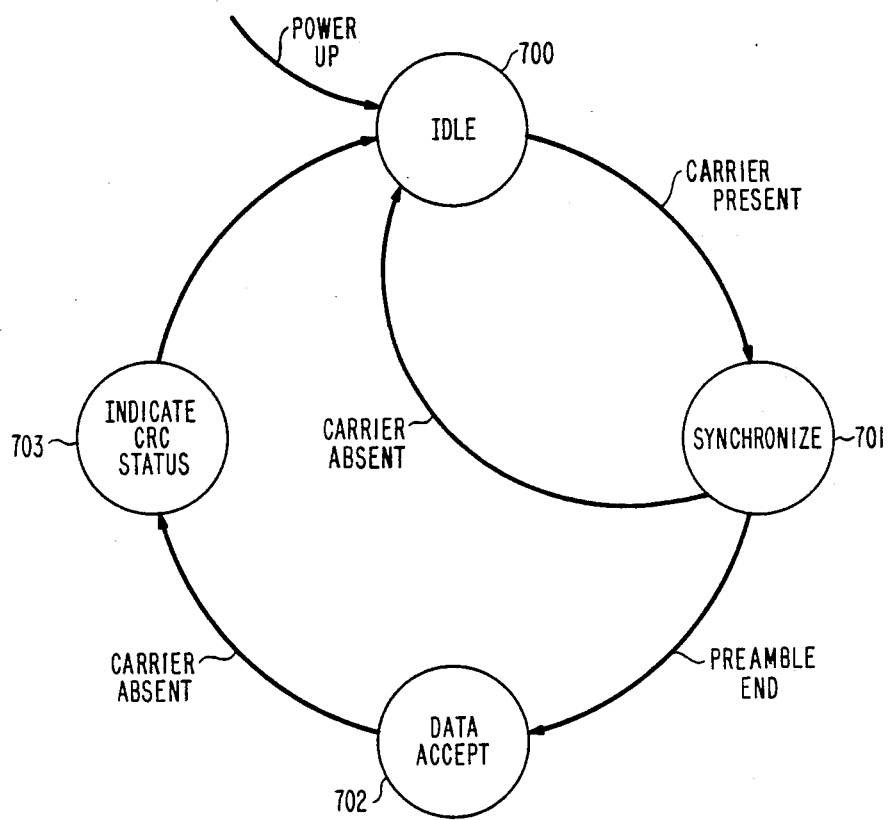

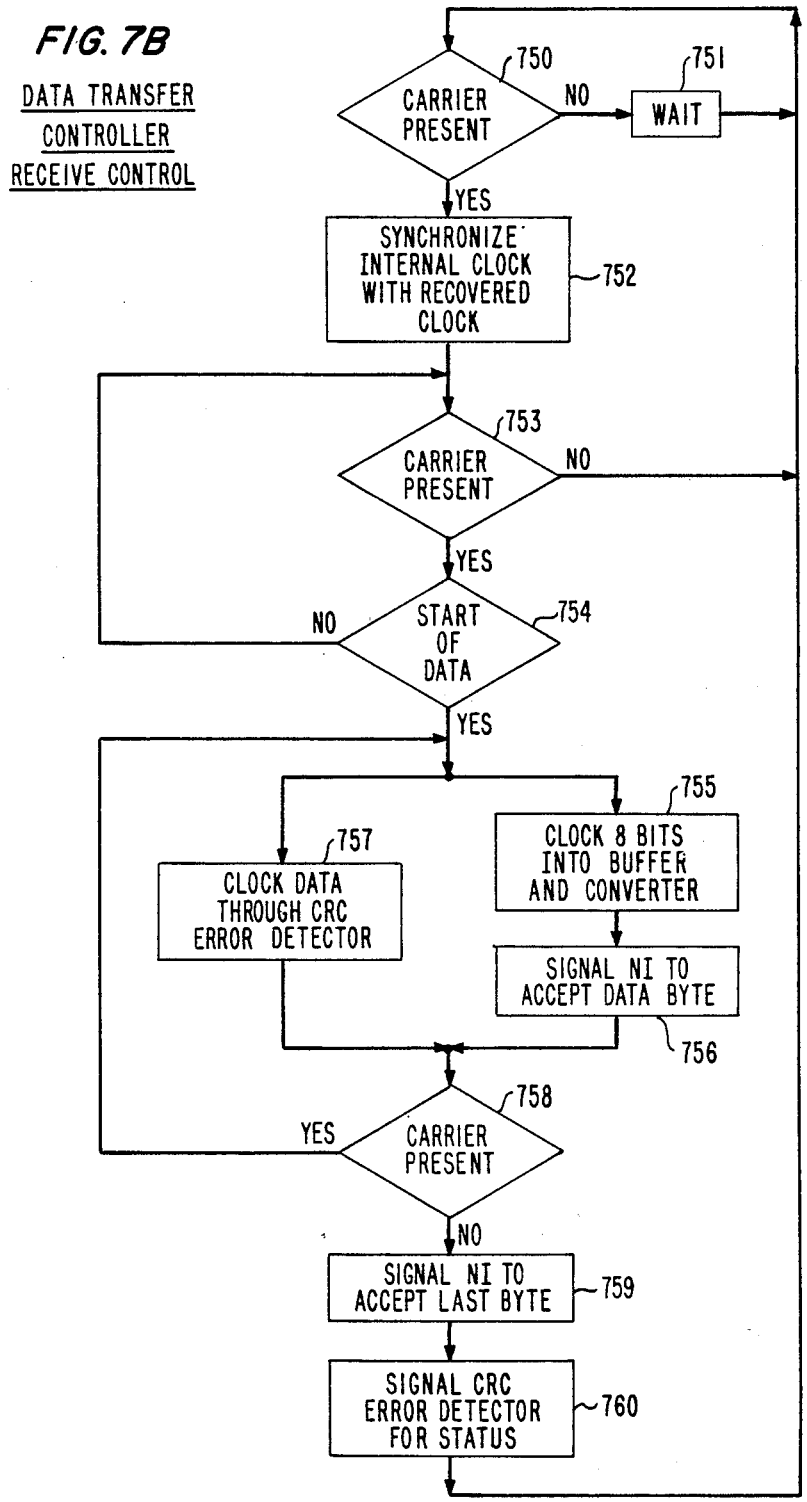

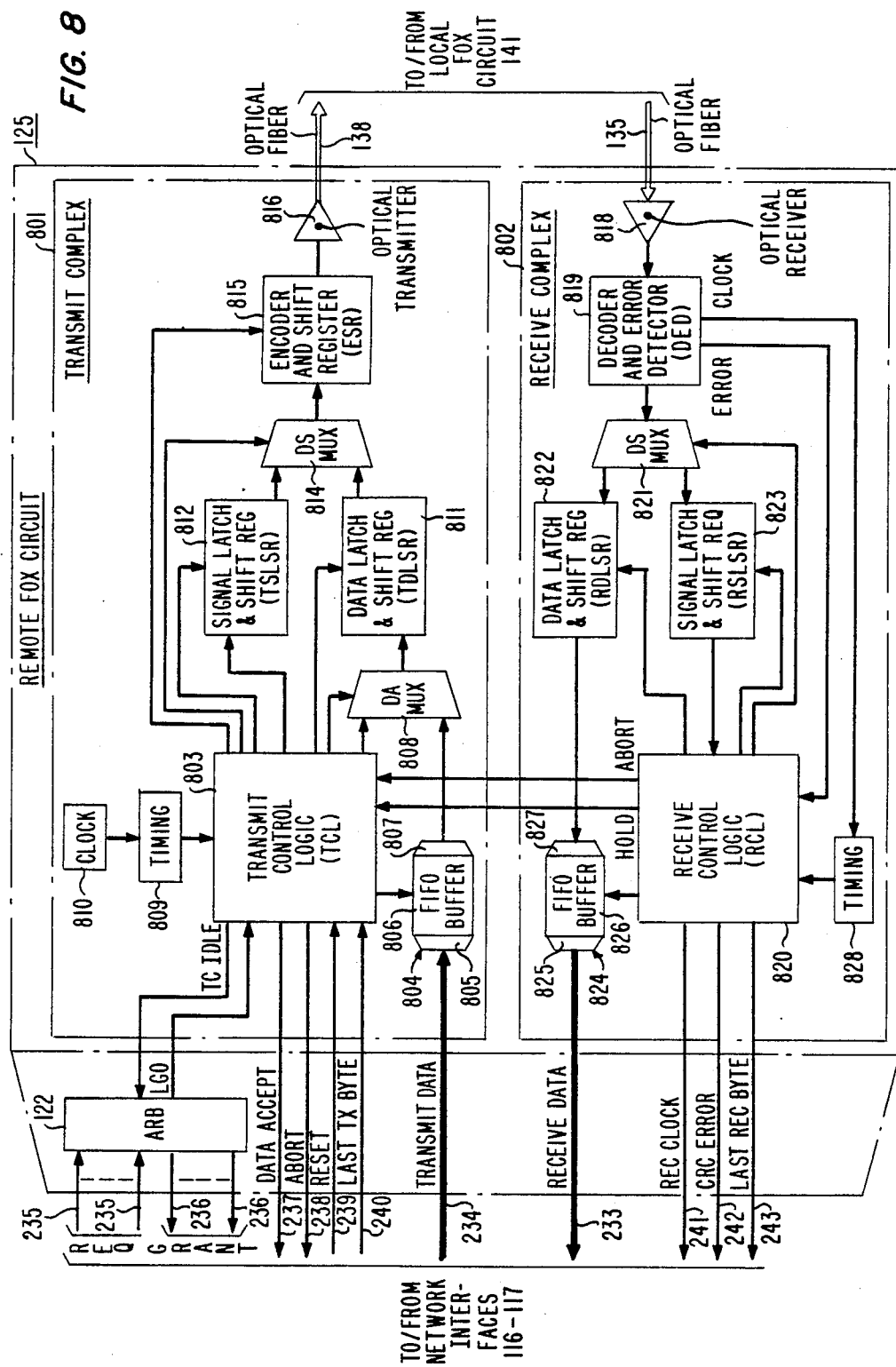

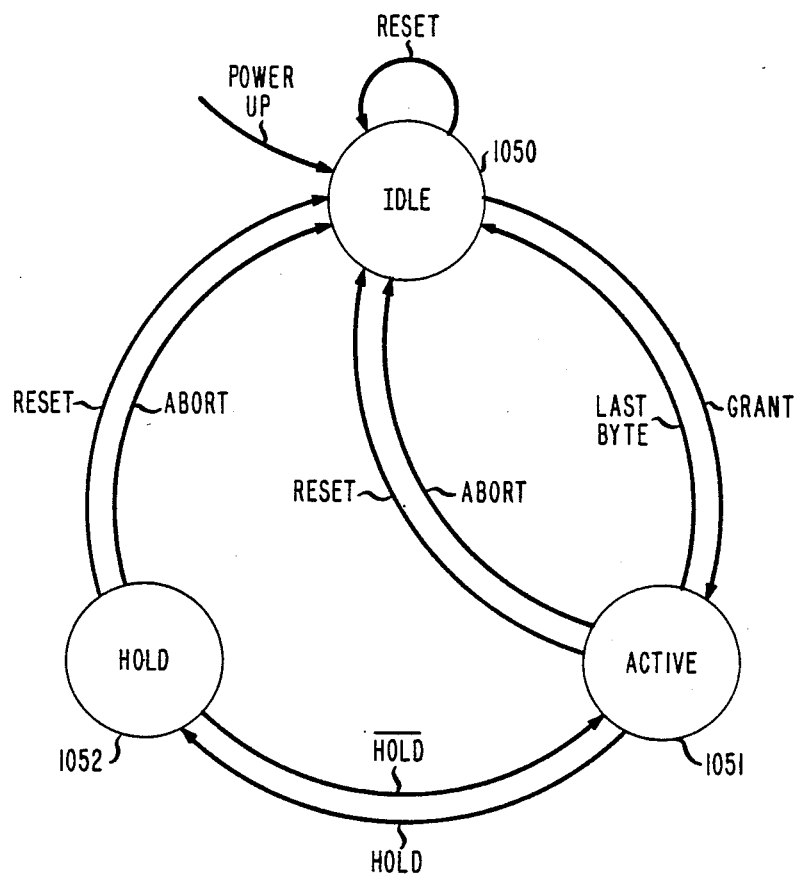

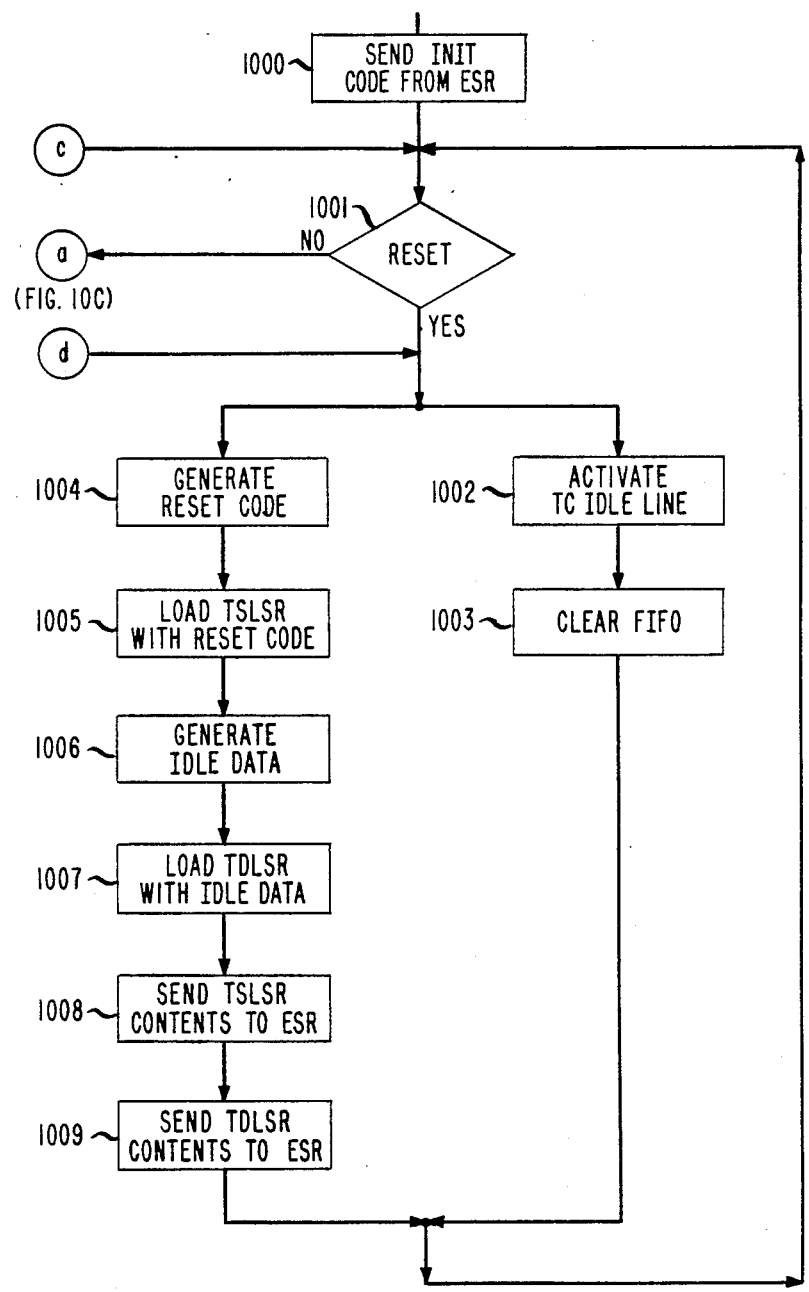

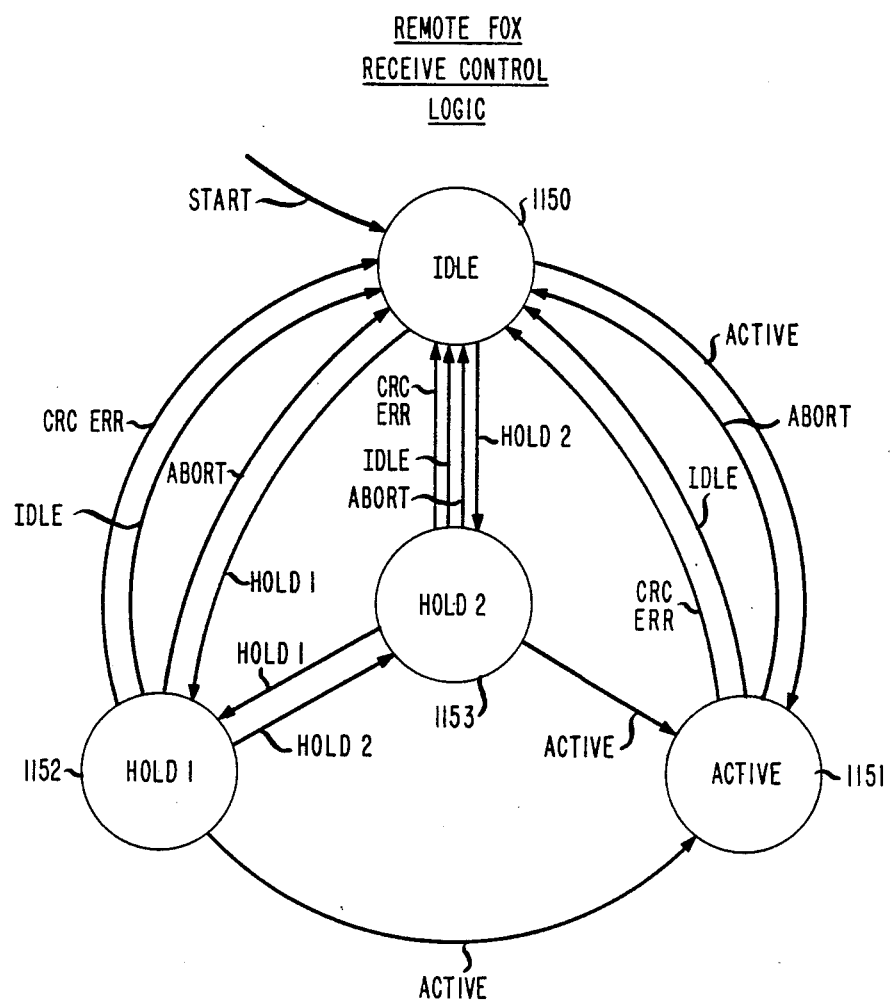

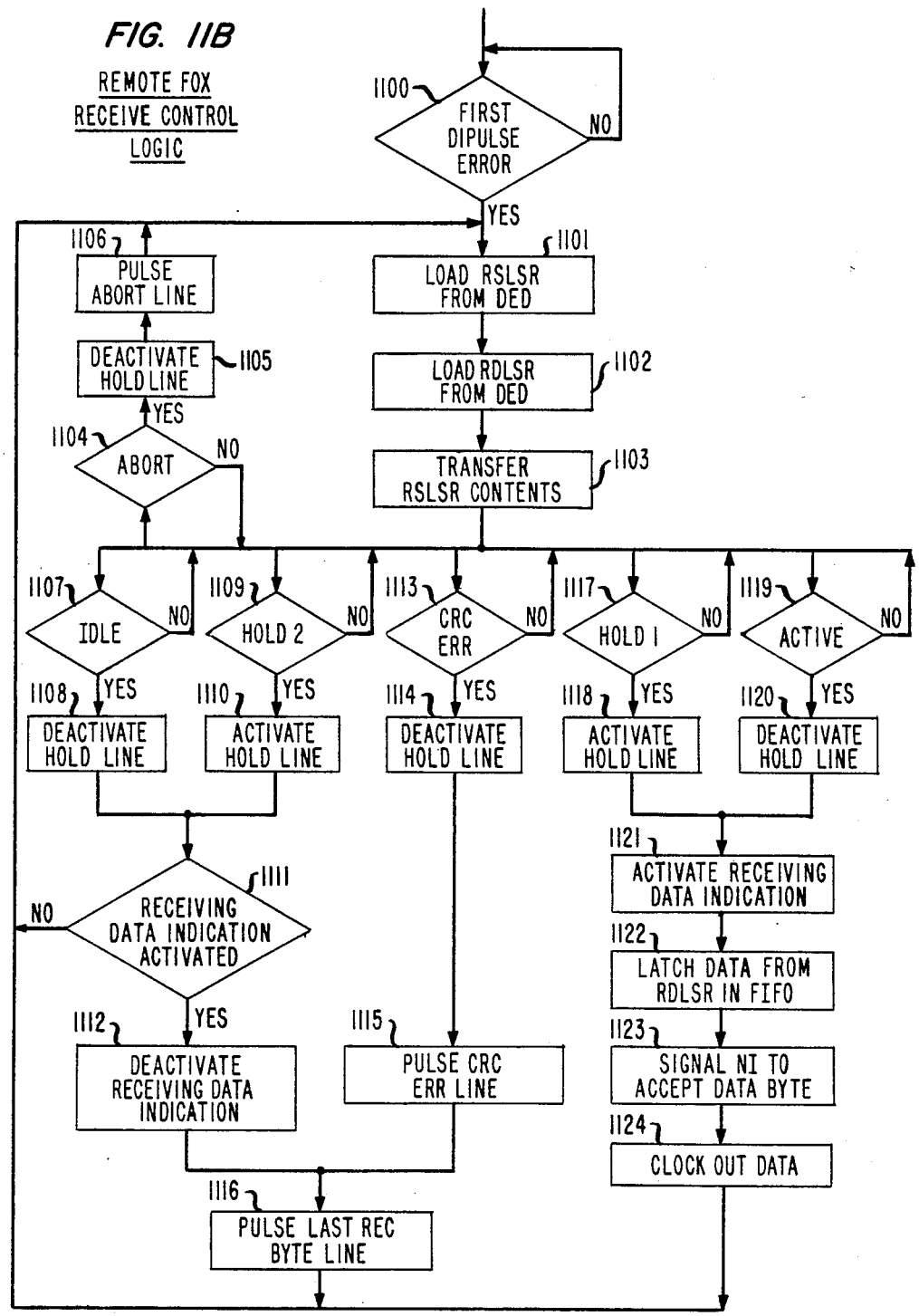

LOCAL FOX RECEIVE CONTROL LOGIC

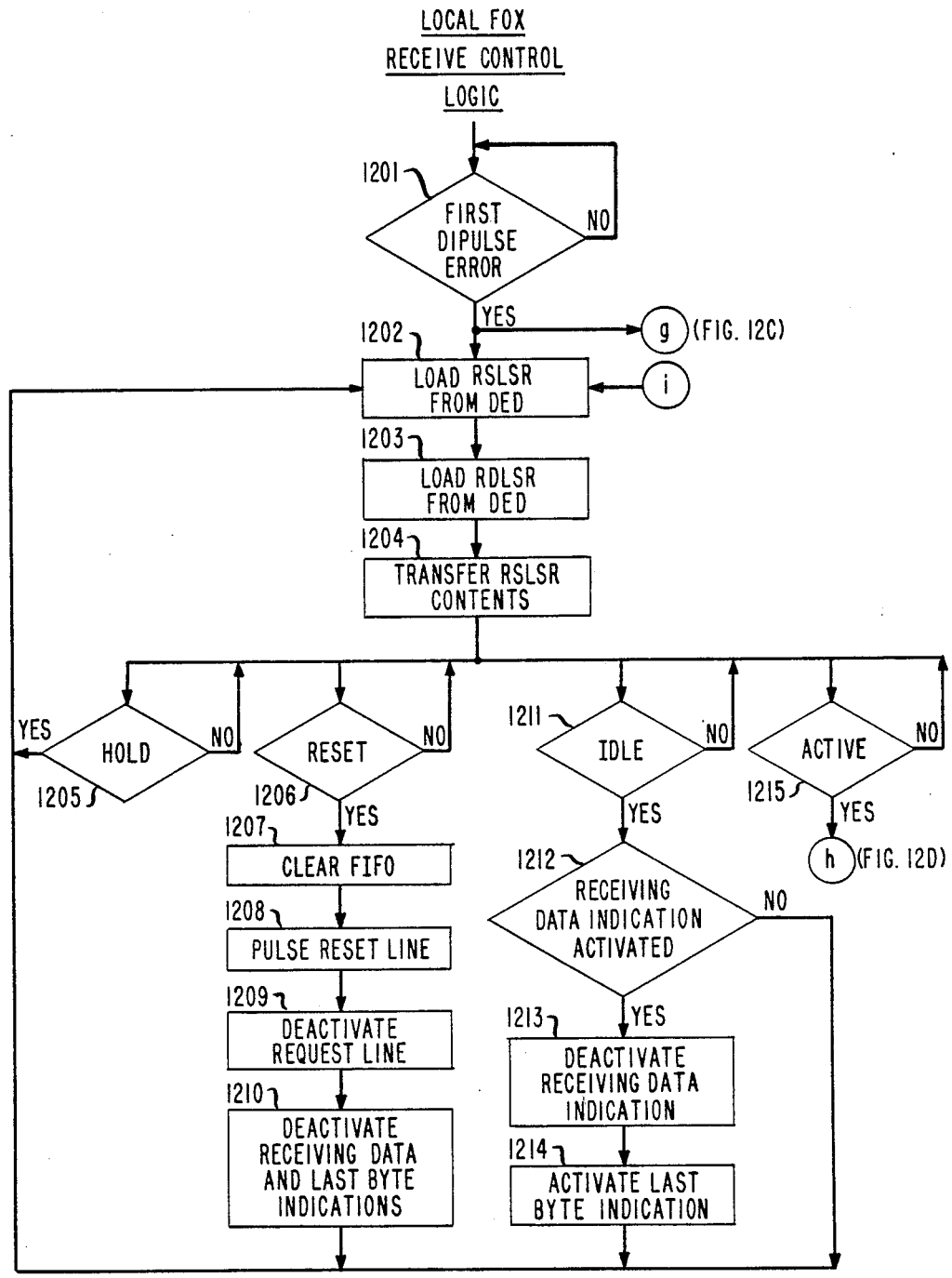

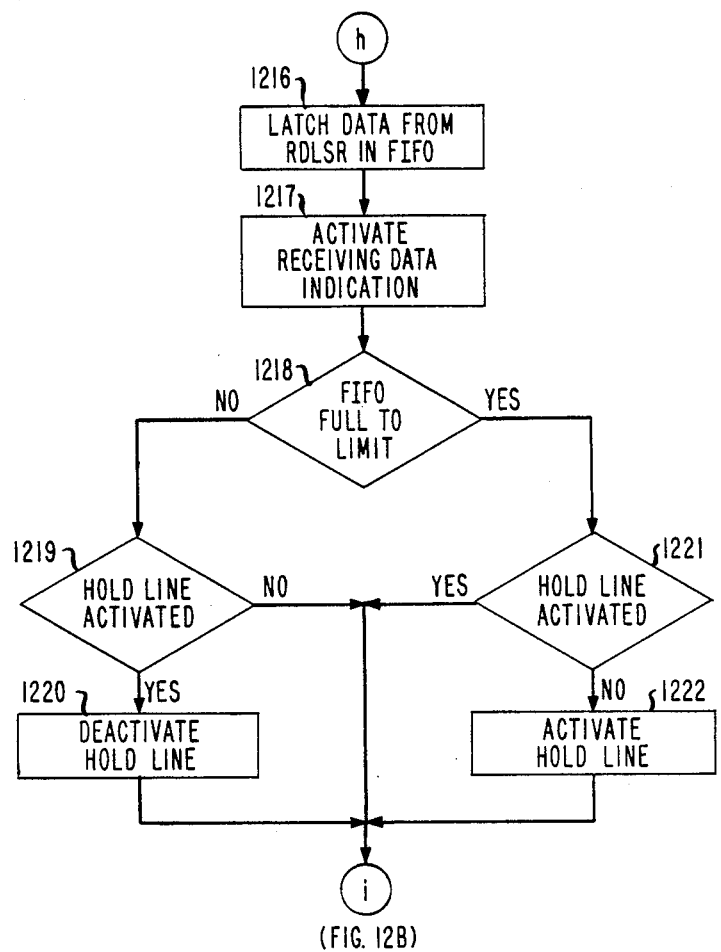

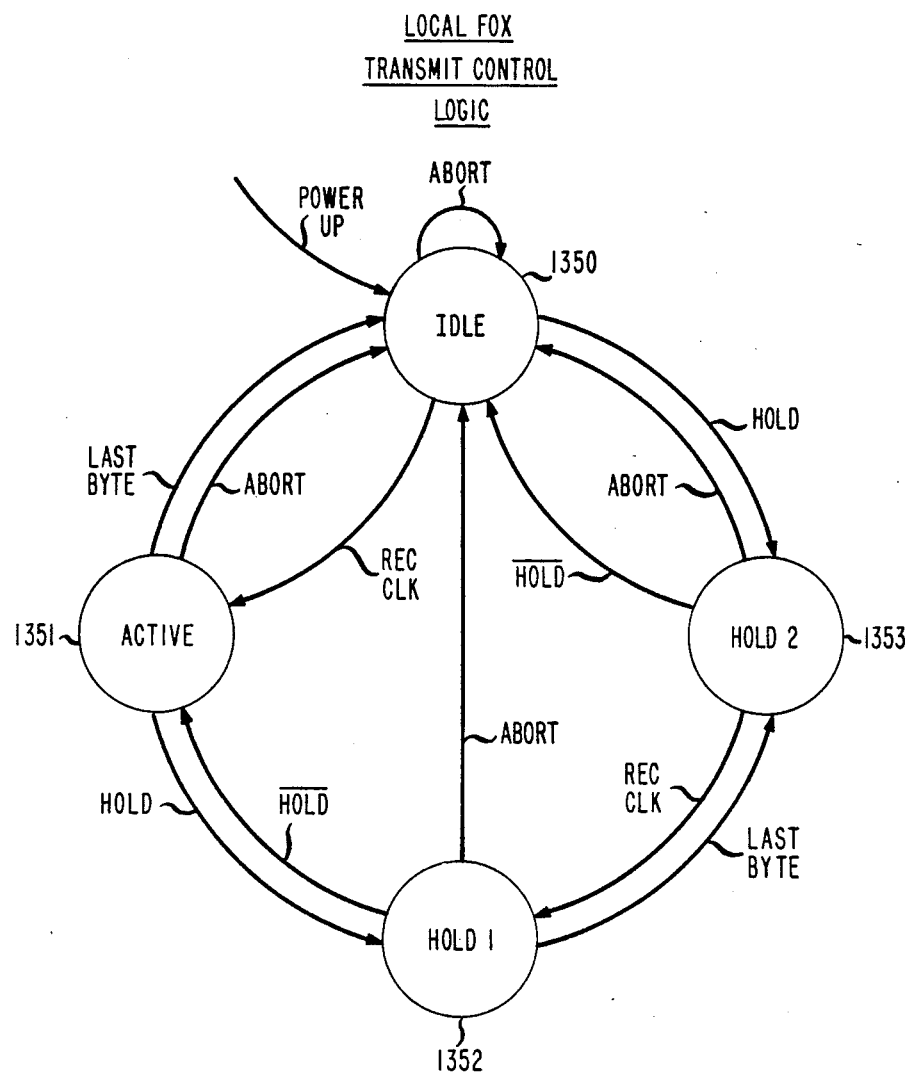

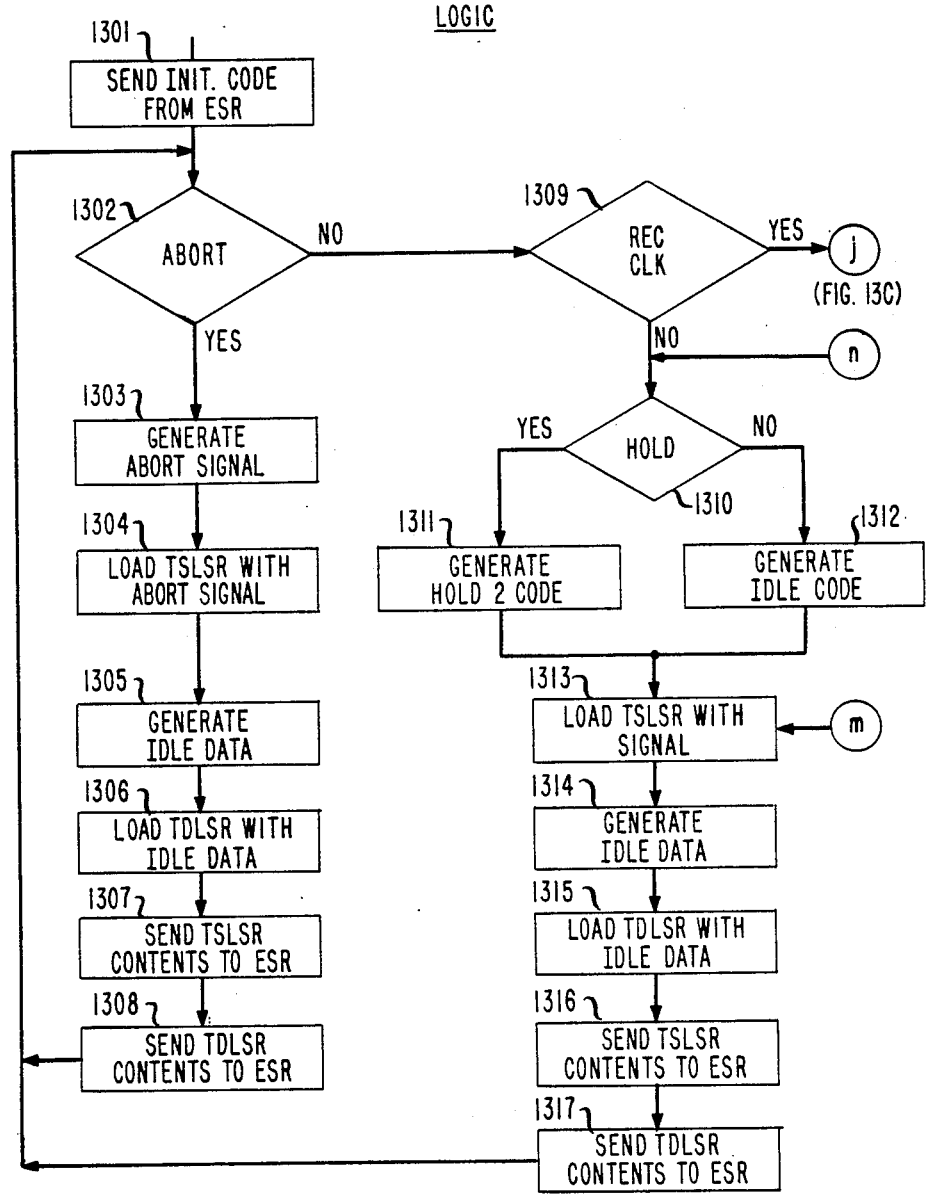

DATA LINK EXTENSION FOR DATA COMMUNICATION NETWORKS

TECHNICAL FIELD

This invention relates to digital communication systems, and more particularly to improvements in extending the interconnection distance of data communication networks.

BACKGROUND OF THE INVENTION

A data communication network includes a communication medium, such as a transmission cable, and a plurality of using devices, such as processors, mass storage devices, or input and output units, connected to the medium for communication.

The interconnection of the devices and the communication medium is commonly achieved by extending the communication medium to all of the devices. If the using devices are located at physically dispersed locations, the medium must be long enough to extend between all of the locations.

This interconnection approach is simple, but has inherent disadvantages stemming from the relatively long length necessitated for the communication medium. These disadvantages relate to the deterioration of electrical characteristics of the medium with increases in the medium's length, as well as to the deterioration of performance characteristics of the network which result from the time delay of signal propagation from one end of the network to the other.

These disadvantages are well exemplified by the linear topology, carrier sense multiple access with collision detection (CSMA/CD) protocol networks that are coming into increasingly greater use. These networks commonly utilize a coaxial cable as the communication medium, and the using units are distributed along the length of the coax and contend with each other for access thereto. A using unit attempts a transmission on the medium only when it detects the medium to be quiescent, and attempts retransmission after it detects a collision, i.e., interference, between its attempted transmission and that of another using unit.

In such a network, the characteristics of a signal transmitted over the medium deteriorate due to factors such as signal attenuation, signal dispersion, and signal noise. The deterioration increases with length of the medium and affects adversely the reliability of communications across the medium. Attempts to improve these characteristics by the use of very high quality, and hence very high cost, coax cable add greatly to system cost. Furthermore, higher quality coax cable generally has a larger diameter, which lowers the flexibility of the cable and thus adversely affects routing capability of the cable.

Coax cable bandwidth decreases with increases in cable length and therefore increasing cable length has a deleterious effect on system throughput. Increases in coax length cause increases in the size of the network collision window—the time during which attempted transmissions by two or more using units can collide—and thus again degrade system performance. And the increased size of the collision window adversely affects the efficiency of data transmissions shorter in time than the collision window.

It is therefore desirable in such communication networks to keep the communication medium as short as possible. But this constraint imposes serious limitations on the extent and configuration, and hence the utility, of such communication networks.

SUMMARY OF THE INVENTION

This invention is directed to solving these and other disadvantages of the prior art.

According to this invention, in a data communication system having a plurality of using units connected to a communication medium an arrangement for interfacing a using unit located any distance away from the medium, particularly a remote using unit, with the medium makes the distance between the remote unit and the medium functionally substantially transparent for purposes of communications on the medium. The interfacing arrangement makes the remote using unit functionally appear located near the medium for purposes of communications on the medium.

Advantageously, the interfacing arrangement comprises three circuits: a first circuit connected to the using unit and to a second circuit for transmitting communications of the using unit to the second circuit for transmission on the medium, the first circuit responsive to receipt of a first signal for pausing transmission of the communications to the second circuit, the second circuit positioned close to the medium and having buffer storage capacity for temporarily storing communication of the using unit for transmission to the medium, and a third circuit cooperative with the second circuit for sending the first signal to the first circuit when unfilled storage capacity of the second circuit decreases to a minimum at least adequate to store, without overflowing, communications receivable from the first circuit before the first circuit receives and responds to the first signal. Preferably, the first circuit is located at the using unit, the third circuit is located at the second circuit, and a communication link connects the first, the second, and the third circuit.

Preferably, the interfacing arrangement further comprises a fourth circuit physically situated in proximity to the medium and connected to the second circuit and to the medium, for communicating across the medium, under the medium's protocol, communications stored by the second circuit, on behalf of the using unit. The communication link is preferably a fiber optic link.

The invention alleviates the problems associated with the prior art. Under the inventive scheme, routing of the network communication medium to all the using units is no longer required. By interfacing using units via the interfacing arrangement over even relatively great distances, for example hundreds of meters or kilometers, to a relatively short communication medium, for example one of meters or tens of meters in length, the invention provides the required interconnection distance without the requirement of providing a network communication medium of like length.

Large interconnection distances can be achieved with a fiber optic communication link because optical cable results in much smaller, generally by orders of magnitude, signal deterioration than a metallic transmission medium of the same length. Besides providing the network with the capability of large interconnection distances, the use of a fiber optic link, as opposed to, for example, a metallic cable link, provides immunity of the link to electromagnetic interference, DC isolation of the using units from the medium, enhanced electro magnetic compatibility, and a strong and lightweight yet relatively low cost link.

By keeping the network communication medium short, the problems associated with a long medium are eliminated. Yet at the same time, by providing long interconnection distances through the communication link, substantial limitations on the extent and configuration of the communication system are removed. Also, the network medium can be made of minimal length to optimize the medium characteristics. The minimization of the length of the medium produces a communication network of essentially star topology, and thus the advantages of a star network topology can be obtained without sacrificing the advantages of a distributed network topology.

The interfacing arrangement can be extended over even large interconnection distances without increasing access time of using units to the system communication medium, from the viewpoint of the medium, relative to the case where the using units are located near the medium. This implies that the bandwidth utilization of the system medium, and hence network throughput, is not affected by such extension. This interconnection approach does not increase the size of the collision window associated with medium access contention protocols, such as the CSMA/CD protocol. No limits are thus imposed on the interconnection distance between a using unit and the bus portion of the network.

These and other advantages of the invention will become apparent during the following description of an illustrative embodiment of the invention, taken together with the drawing.

BRIEF DESCRIPTION OF THE DRAWING

FIGS. 3A and 3B are a state diagram and an operational logic flow diagram, respectively, of the transmit control of the network interface of FIG. 2;

FIGS. 4A and 4B are a state diagram and an operational logic flow diagram, respectively, of the receive control of the network interface of FIG. 2;

FIGS. 6A and 6B are a state diagram and an operational logic flow diagram, respectively, of the transmit control and clock of the data transfer controller of FIG. 5;

FIGS. 7A and 7B are a state diagram and an operational logic flow diagram, respectively, of the receive control and clock of the data transfer controller of FIG. 5;

FIG. 8 is a block diagram of a remote fiber optic extension circuit of FIG. 1;

FIGS. 10A and 10B-D are a state diagram and an operational logic flow diagram, respectively, of the transmit control logic of the remote fiber optic extension circuit of FIG. 8;

FIGS. 11A and 11B are a state diagram and an operational logic flow diagram, respectively, of the receive control logic of the remote fiber optic extension circuit of FIG. 8;

FIGS. 12A and 12B-D are a state diagram and an operational logic flow diagram, respectively, of the receive control logic of the local fiber optic extension circuit of FIG. 9; and FIGS. 13A and 13B-D are a state diagram and an operational logic flow diagram, respectively, of the transmit control logic of the local fiber optrc extension circuit of FIG. 9.

DETAILED DESCRIPTION

Network

Figure 1:
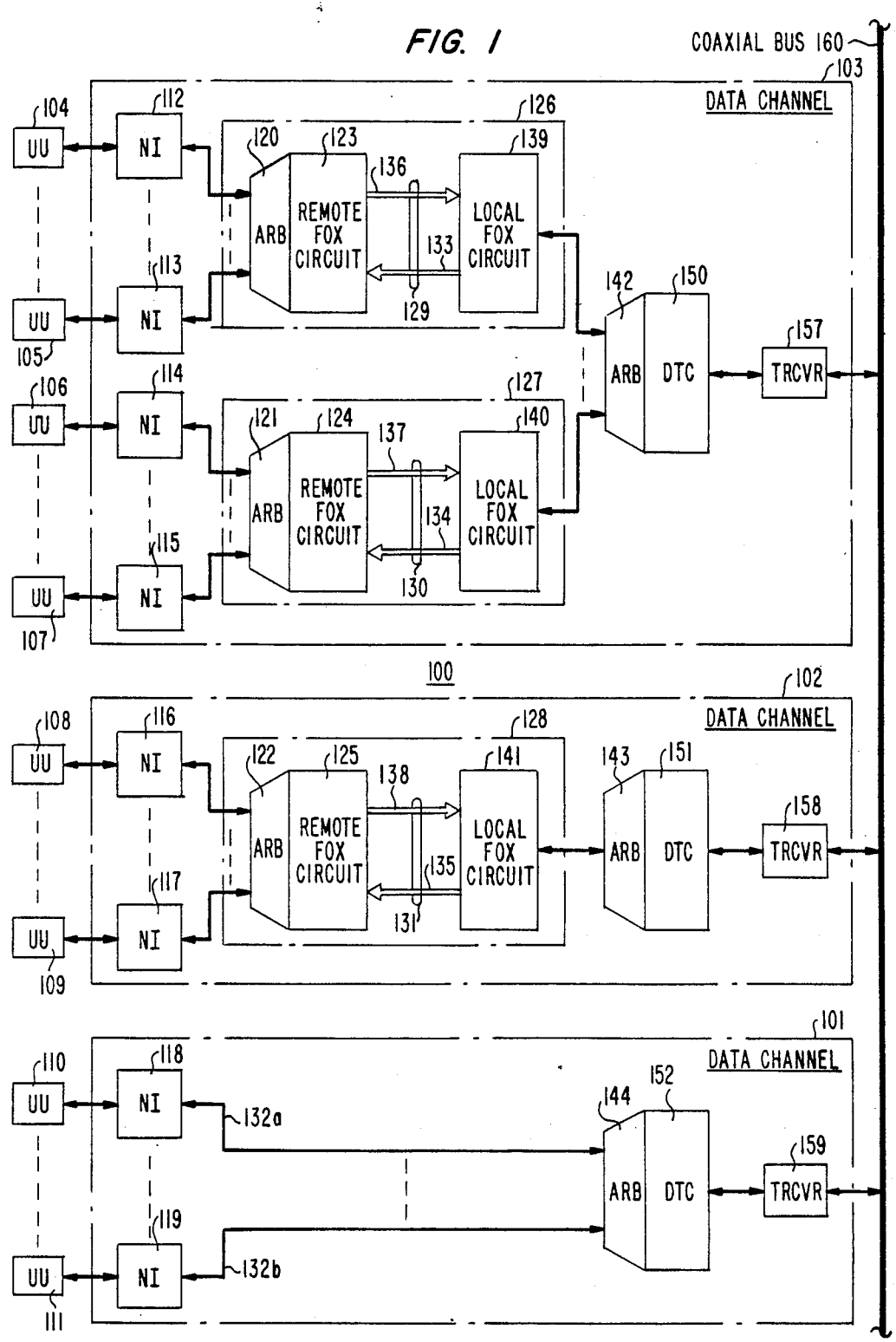
FIG. 1 is a block diagram of an illustrative embodiment of a data communication network.

FIG. 1 shows an embodiment of an illustrative data communication network 100 configured according to the present invention. The primary function of the network 100 is transferring data packets between using units 104-111 that are interfaced at various points to the network communication medium. Data processing devices such as general purpose computers, microprocessors, and remote consoles or terminals are referred to hereinafter as using units.

A packet is an information signal sequence generally comprising at least a preamble field, a data field, and an error checking code field. The preamble is used for synchronization at the receiving site, before processing of the data of the received packet. The error checking code is appended to a packet to allow detection of transmission errors. The data field generally includes a packet destination address, a packet source address, and the body of the message being conveyed. The destination address specifies for whom the packet is intended, and the source address field identifies the sender of the packet.

The network 100 is constructed around a communications medium such as a bus 160 which distributes, broadcasts, packets between the various parts of the network 100. The bus 160 may be any suitable medium, for example a coaxial cable or an optical fiber cable. In the example of FIG. 1 a coaxial cable bus 160 is assumed. The bus 160 may be of any desired length limited only by the electrical characteristics of the medium and the physical requirements of interconnecting all of the various parts of the network 100 to the bus 160. Preferably the bus 160 is of a minimal length, such that the network 100 assumes substantially a star network configuration.

As illustrated in FIG. 1, the multipoint data communications network 100 has several data channels 101-103 interconnected by the bus 160. For purposes of this explanation, a data channel consists of all apparatus that transmits and receives data between one or more using units and a point of connection on the bus 160. The data channels 101-103 interface the using units 104-111 to the bus 160 for communication. Information, in the form of data packets, is exchanged by the data channels 101-103 over the bus 160.

The network 100 follows a carrier sense multiple access/collision detect (CSMA/CD) communication protocol. Transmission on the bus 160 of packets from any data channel 101-103 is commenced only when the bus 160 is sensed to be quiescent, i.e., to the extent that the channel 101-103 can determine, the bus 160 is idle and no other communications are taking place thereon. Should it occur that packets transmitted by more than one of the channels 101-103 appear on the bus 160 at the same time, the packets collide, i.e., they interfere with each other and become garbled. The collision is sensed at the data channels 101-103 whose packets collided. In response, the packet transmissions are terminated and a jam signal is transmitted by the colliding data channels 101-103 on the bus 160. The data channels 101-103 attempt to retransmit the collided packets following some time interval after the collision has occurred. Packets transmitted from a data channel 101-103 on the bus 160 are transported by the bus 160 to all channels 101-103. It is up to circuitry in each data channel 101-103 to examine each packet transported thereto to determine whether the packet is or is not addressed to one of its subtending using units, and to treat the packet accordingly.

Illustrated in FIG. 1 are two typical lightwave data channel configurations 102 and 103 and one cable-connected data channel 101. Data channels 102 and 103 use fiber optic extensions 126-128 and data channel 101 uses wire extensions 132a-b for the communication link that extends communications between the bus 160 and the respective using units.

In each case, the data channel 103-101 is connected to the bus 160 via a transceiver 157-159, respectively. The transceivers 157-159 are substantially identical, and they are conventional devices. Included in each transceiver 157-159 is a transmitter for amplifying and transmitting packets from its associated data channel onto the bus 160, a receiver for receiving packets transported thereto by the bus 160 and for forwarding received packets to its associated data channel, and a collision detector for sensing collisions of two or more packets on the bus 160 and informing the associated data channel thereof.

In the data channels 103-101 the transceivers 157-159 connect to data transfer controllers (DTCs) 150-152, respectively. The data transfer controllers 150-152 regulate access by their respective data channels to the bus 160. The data transfer controllers 150-152 control transfers of packets to and from the transceivers 157-159. Each data transfer controller 150-152 provides the functions of encoding of data into packets and decoding of packets into data, data buffer storage, and serial-to-parallel and parallel-to-serial data stream conversions. Each data transfer controller 150-152 also monitors collision detection signals and receiver output from the transceiver for transmission control, and generates various control signals for controlling the operation of the associated data channel. Because a using unit has access to the bus 160 only through its data channel's data transfer controller, in essence the data transfer controller communicates with the bus 160 on behalf of the subtending using units. Because the data transfer controllers initiate and control communications on the bus 160, they are located close to, preferably at most on the order of meters away from, the bus 160 to minimize their interconnection distance to the bus 160 and hence their delay in sensing conditions on the bus 160 and responding thereto. Data transfer controllers are discussed in greater detail below in conjunction with FIGS. 5-7.

The data transfer controllers 150-152 connect to the respective extensions 126-128 and 132. As can be seen in FIG. 1, each data transfer controller can connect to more than one extension. For example, the data transfer controller 150 is shown connected to two fiber optic extensions 126 and 127, and the data transfer controller 152 is shown connected to a plurality of wire extensions 132a-b. Hence the data transfer controllers 150-152 utilize arbitrators 142-144, respectively, to control and to limit to one at a time access by the associated extensions to the controllers 150-152. The arbitrators 142-144 are conventional devices operating in substantially conventional manner.

Only one extension 128 is shown connected to the arbitrator 143 and the data transfer controller 151. Thus the arbitrator 143 is substantially superfluous in the network 100 as shown, but provides that network 100 with capability of expansion, through connecting further data extensions, using units, and associated network interfaces, to the arbitrator 143.

The extensions 126-128 and 132 provide communication links for extending communications from the data transfer controllers 150-152, which are positioned close to the bus 160, to the using units 104-111, which may be positioned far away from the bus 160. While only two using units are shown in FIG. 1 to subtend each extension 126-128 and 132, each extension can serve more than two using units.

At the using units 104-111 the extensions 126-128 and 132 connect to network interfaces (NIs) 112-119, respectively. Each using unit 104-111 has its own network interface 112-119, respectively, which buffers communications passing between the using unit 104-111 and the respective extension. The network interfaces 112-119 function in a substantially conventional manner and provide services such as communication protocol conversion, communication transfer rate conversion, and communication buffering. Network interfaces are discussed in greater detail in conjunction with FIG. 2.

Wire Data Link

The wire extensions 132a-b extend communications for only a limited distance, as the wire medium suffers from some of the deficiencies that were discussed previously. The interconnection distance provided by the wire data channel 101 is, for example, tens of meters. Hence the wire data channel 101 is used only in conjunction with using units 110-111 that are located in proximity, relatively close, to the bus 160.

The wire medium of the data links 132a-b extends directly from input and output ports of the network interfaces 118-119, respectively, to ports of the data transfer controller 152 and its associated arbitrator 144. Although two using units 110-111 are illustrated, each extension 132 can serve more than two using units.

When a wire data link 132 is used, the functional capabilities of the data transfer controller make a using unit appear to be adjacent to the bus 160 for purposes of communications on the bus 160, provided that the length of the wire data link 132 is limited so that round trip communication over the wire data link 132 takes less time than the time-length of the packet preamble.

Lightwave Data Link

The lightwave extensions 126-128 can extend communications between the using units 104-109 and the bus 160 over large distances, for example, distances of hundreds of meters or of kilometers. While they may be used to extend communications over short distances as well, the lightwave extensions 126-128 are generally used in conjunction with using units 104-109 that are located remotely, relatively far, from the bus 160.

The lightwave extensions 126-128 are referred to hereinafter as fiber optic extensions (FOXs) 126-128 because they utilize optical fibers as the medium for transporting communication signals. The FOXs 126-128 are substantially identical. Each FOX comprises a pair of FOX circuits, one referred to as a remote FOX circuit, located in proximity of and connected to the network interfaces, and the other referred to as a local FOX circuit, located in proximity of and connected to the data transfer controller. The network interfaces are in turn located near, i.e., in proximity to the subtending using units, in terms of the interconnection distance between them. Hence the remote FOX circuit lies proximate to the subtending using units. The pair of local and remote FOX circuits is interconnected by a duplex optical fiber link that includes a pair of simplex optical fibers. Hence the FOX 126 comprises a remote FOX circuit 123, a local FOX circuit 139, and an optical fiber link 129 that includes fibers 136 and 133. Similarly, the FOX 127 comprises a remote FOX circuit 124, a local FOX circuit 140, and an optical fiber link 130 that includes fibers 137 and 134. And the FOX 128 comprises a remote FOX circuit 125, a local FOX circuit 141, and an optical fiber link 131 that includes fibers 138 and 135.

As can be seen in FIG. 1, each remote FOX circuit 123–125 can connect to more than one network interface. For example, the remote FOX circuit 123 is shown connected to network interfaces 112–113, the remote FOX circuit 124 is shown connected to network interfaces 114–115, and the remote FOX circuit is 125 shown connected to network interfaces 116–117. The remote FOX circuits 123–125 utilize arbitrators 120–122, respectively, to control and to limit to one at a time access by the associated network interfaces to the remote FOX circuits 123–125. The arbitrators 120–122 are conventional devices operating in substantially conventional manner.

A local FOX circuit emulates network interface functions to a data transfer controller, while a remote FOX circuit emulates data transfer controller functions to a network interface. The functional capabilities of a data transfer controller and a FOX make remote using units appear to be located close to the bus 160 for purposes of communications on the bus 160, regardless of the length of the distance over which the FOX provides an extension of communications. Furthermore, each FOX 126–128 renders the distance between the associated network interfaces and data transfer controller functionally transparent, so that from the network communication viewpoint i.e., from the viewpoint of the bus 160, the network interfaces 112–117 along with their associated using units 104–109 appear to be functionally positioned close to the data transfer controller 150–151, and hence close to the bus 160. Neither the network interfaces 112–117 nor the data transfer controllers 150–151 are aware of the existence of the lightwave data extensions 126–128, so that from the viewpoint the network interfaces 112–117 and the data transfer controllers 150–151, the interfaces 112–117 likewise functionally appear to be positioned adjacent to the data transfer controllers 150–151. This contrasts with the common implementation of a network of this type wherein access time to the bus 160 is affected by the increased interconnection distance to the bus 160, to the detriment of network communication performance. The common implementation therefore has "strict limits" on extension distance, while the present scheme removes substantially all limits on interconnection distance.

Because each remote FOX circuit 123–125 is adapted to emulate a data transfer controller to a network interface, a network interface can connect to either a FOX 126–128 or directly to a data transfer controller 105–107. Therefore a FOX can be added to an existing network 100 simply by disconnecting network interfaces from their associated data transfer controller and by interposing therebetween one or more FOXs. Similarly, a FOX can be deleted from an existing network 100 by disconnecting network interfaces and the data transfer controller from the FOX and by connecting the network interfaces directly to the data transfer controller.

Having described the network 100 in general terms, more detailed attention will now be turned to particular circuits thereof, starting with the network interface circuits 112–119.

Network Interface

As was mentioned previously, all of the network interfaces 112–119 are substantially the same in overall structure and functionality. Therefore it will suffice to discuss a representative network interface, for example the interface 119, with the understanding that the discussion applies to all other network interfaces 112–118 as well.

Figure 2:
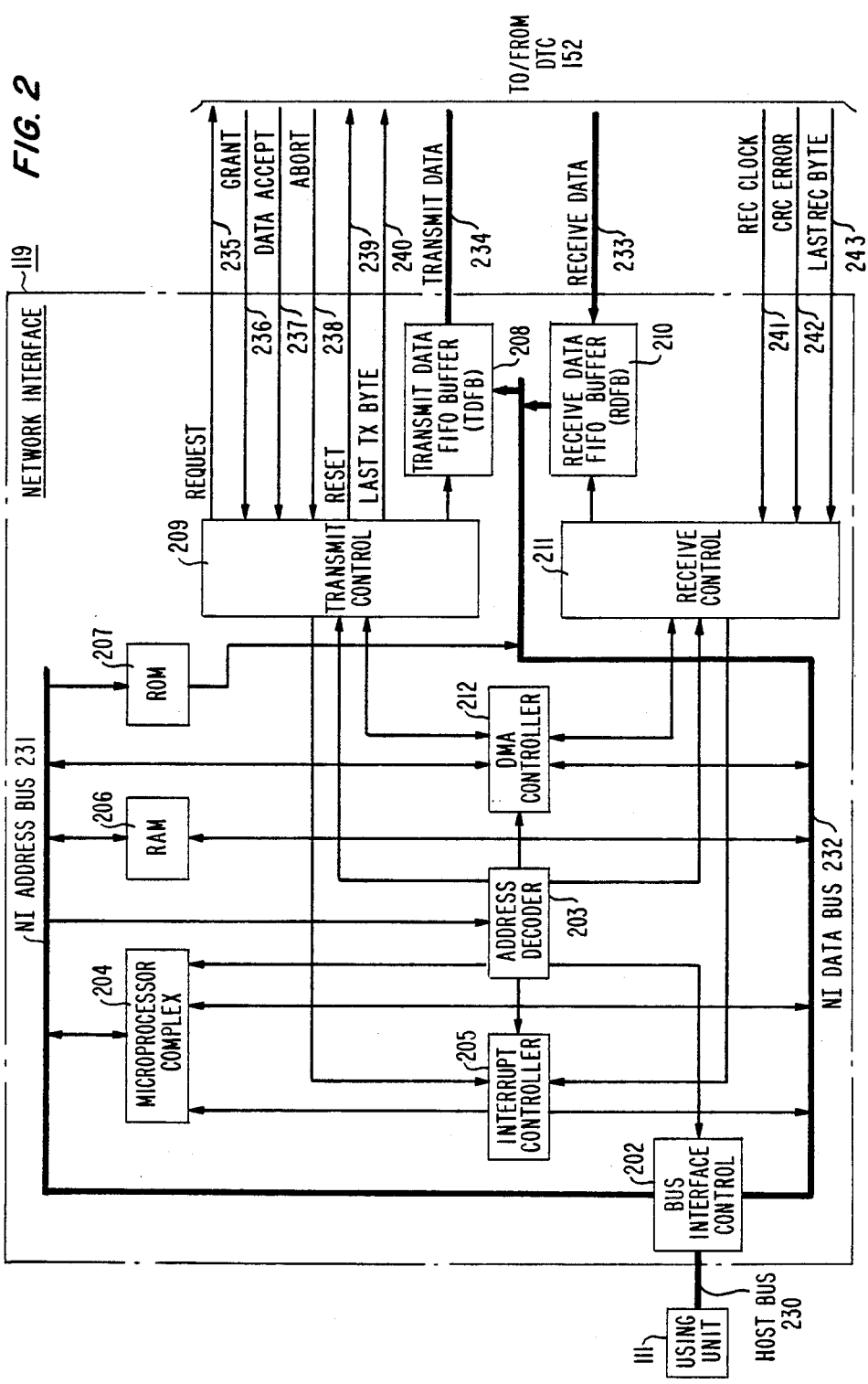
FIG. 2 is a block diagram of a network interface of FIG. 1.

The network interface 119 is illustrated in block form in FIG. 2. The network interface 119 facilitates communications between the data transfer controller 152 and the using unit 111. A network interface with the capabilities described herein may be achieved with known technology and commercially available components. For example, the functionality of the network interface is subsumed in that of the commercially available Processor Board of the Intel iSCB 550 Ethernet ® Controller board set, of Intel Corporation, Santa Clara, Calif.

Connection of the network interface 119 to the using unit 111 is achieved via a conventional communication bus, herein referred to as the host bus 230, which connects to a bus interface and control circuit 202 of the interface 119. The bus interface and control 202 interfaces the host bus 230 to an NI ADDR bus 231 and to an NI DATA bus 232 internal to the network interface 119. The bus interface and control 202 drives the buses 230–231, receives data and addresses thereacross, provides format conversion for information being transferred between the buses 230–232, and provides individualized control, as required, for the specific using unit 111. The bus interface and control 202 may be implemented in the commercial circuit SN 74154 of Texas Instruments Inc., Dallas, Tex.

A conventional address decoder circuit 203 is connected to the bus 231 and has signal lines connecting it to each circuit of the network interface 119 except for storage circuits. The address decoder circuit 203 monitors the NI ADDR bus 231, and translates addresses appearing thereon into enable signals on the signal lines. For example, the address decoder circuit 203 compares the destination address of each received data packet with the channel address assigned to the network interface 119 to determine whether the packet is addressed to the interface 119, and on the basis of that determination generates appropriate enable signals to cause the packet to be either ignored by the interface 119 or processed and data contained therein sent to the using unit 111.

Connected to the NI ADDR bus 231 and NI DATA bus 232 are a random access memory (RAM) 206 and a read only memory (ROM) 207. These are conventional storage devices, and they store the program which provides the network interface 119 with its functionality and tailors it for use with the particular using unit 111. The RAM 206 additionally provides temporary storage that can be used for buffering data, scratch pad, and other holding functions.

The program stored in the RAM 206 and ROM 207 is executed by a microprocessor complex 204 which is likewise connected to the buses 231 and 232. The microprocessor complex 204 provides the intelligence of the network interface 119. Inter alia, it performs framing (packetizing) of data to be transmitted to the data transfer controller, performs address translation of logical channel destination addresses supplied by the using unit 111 into physical network destination addresses for inclusion in packets, performs packet source address generation, performs collision backoff functions to satisfy the CSMA/CD network protocol, performs conversion of received network physical addresses into logical addresses for use by the using unit 111, and performs direct memory accesses (DMA) to memory of the using unit 111. The microprocessor complex 204 may be implemented in an 8086 circuit and its associated circuitry, made available by Intel Corporation.

While the microprocessor complex 204 provides DMA functions to memory of the using unit 111, DMA functions on board the network interface 119 are performed by a DMA controller 212, which is likewise connected to the buses 231 and 232. The DMA controller 212 provides for control of the buses 231 and 232 and of the RAM 206 to transfer data between the RAM 206 and memories that buffer data destined for and received from the data transfer controller 152. The DMA controller 212 may be implemented in an Intel 8237 circuit.

An interrupt controller 205 has inputs connected to various devices of the network interface 119 that are allowed to issue interrupts to the microprocessor complex 204. The interrupt controller has outputs connected to the complex 204 and to the NI DATA bus 232. From the various devices the interrupt controller 205 receives interrupt signals destined for the complex 204, and it translates these signals into a single interrupt signal that it outputs to the complex 204, plus a code which provides program control transfer information that the complex 204 can retrieve from the bus 232 in response to the interrupt signal. The interrupt controller 205 can be implemented in an Intel 8259A circuit.

The network interface 119 is connected to the data transfer controller 152 by a wire data link 132b which includes a RECEIVE DATA bus 233, a TRANSMIT DATA bus 234, and a plurality of signal lines 235–243. The RECEIVE DATA bus 232 terminates in the network interface 119 in a Receive Data FIFO Buffer (RDFB) 210. The TRANSMIT DATA bus 234 originates in the network interface 119 at a Transmit Data FIFO Buffer (TDFB) 208. Both the RDFB 210 and the TDFB 208 are conventional first-in first-out buffer memories, such as the circuit Texas Instruments SN-74 S225, and they buffer data being transferred between the network interface 119 and the data transfer controller 152. The RDFB 210 and the TDFB 208 allow data transfers between the data transfer controller 152 and the network interface 119 under control of and at a rate determined by the data transfer controller 152. They also allow data transfers between themselves and the RAM 206 at any desired, and perhaps varying, rate, as dictated by other components of the network interface 119, such as the DMA controller 212 or the RAM 206.

Transmission of data from the network interface 119 to the data transfer controller 152, and vice-versa, is controlled by a transmit control 209 and a receive control 211, respectively. The controls 209 and 211 control the operation of the TDFB 208 and the RDFB 210, respectively. The controls 209 and 211 connect to the signal lines 235–240 and 241–243, respectively, leading to the data transfer controller 152 for communication therewith, and they likewise connect to the DMA controller 212 for communication. The controls 209 and 211 can issue interrupts to the microprocessor complex 204 via the interrupt controller 205. The controls 209 and 211 are sequential logic circuits, and they are defined by the functional diagrams of FIGS. 3 and 4, respectively.

NI Transmit Control

Figure 3B:
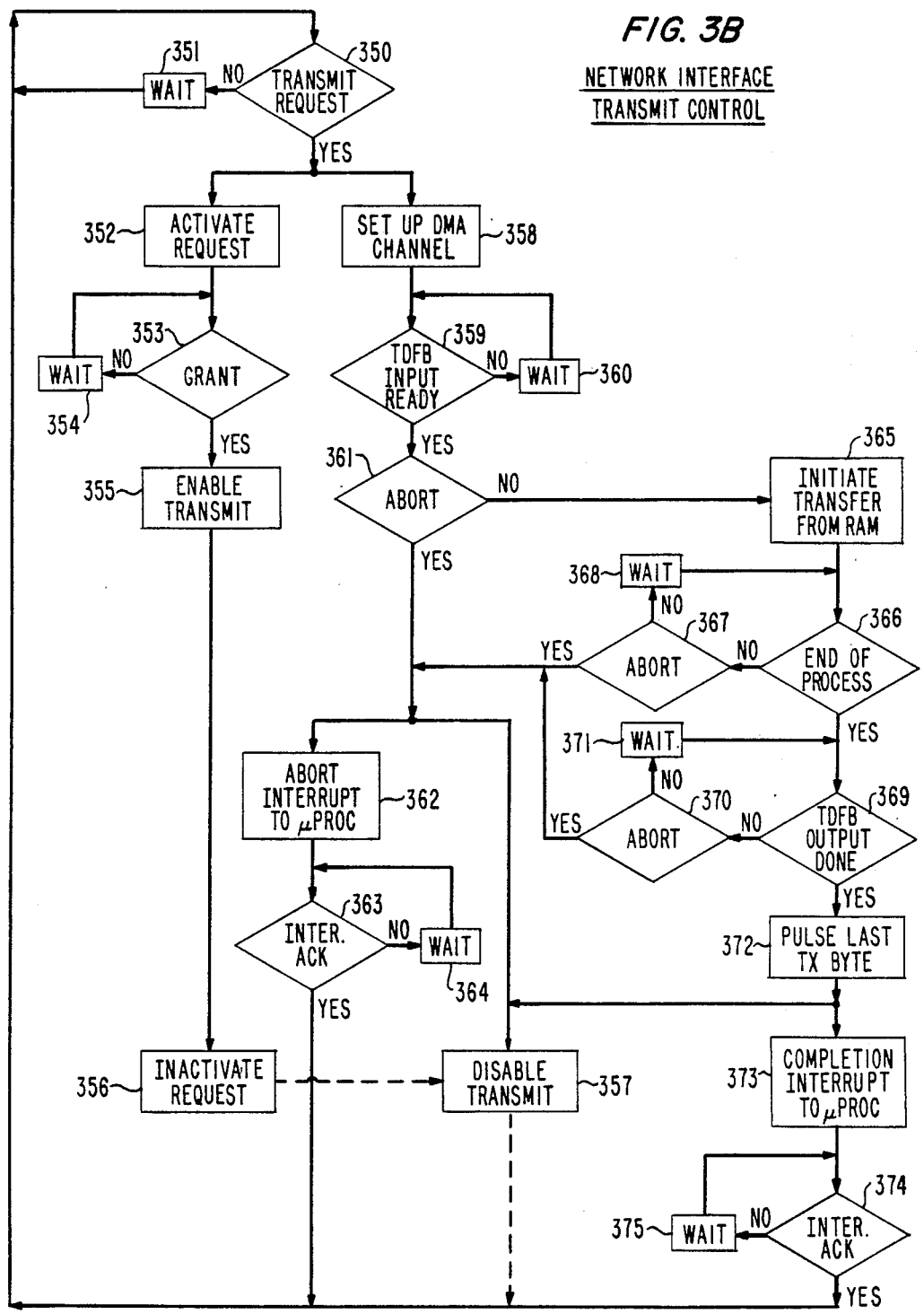

Considering first the operation of the transmit control 209, reference is made to FIGS. 3A and 3B which define the circuit 209 and its operation in state diagram and logic flow diagram forms, respectively.

On power-up of the network interface 119, the transmit control 209 pulses, momentarily asserts, the RESET signal line 239 to reset, initialize, the data transfer controller 152. The transmit control then assumes idle state 300, shown in FIG. 3A.

When data transfers are not taking place from the using unit 111 to the data transfer controller 152, the transmit control 209 is in the idle state 300. In this state the transmit control 209 waits for receipt of a transmit request from the DMA controller 212, as indicated in blocks 350 and 351 of FIG. 3B.

When the using unit 111 has data that it wishes to transmit on the network bus 160, it notifies the bus interface control 202 and outputs the data on the host bus 230. The bus interface control 202 in turn notifies the microprocessor complex 204 and interfaces the host bus 230 to the NI DATA bus 232. The microprocessor complex 202 causes the data from the using unit 111 to be stored in the RAM 206 and then notifies the DMA controller 212 that the network interface 119 has data to transmit to the network bus 160.

The DMA controller 212 responds by issuing a transmit request, to which the transmit control 209 responds by entering request pending state 301. The transmit control 209 asserts the REQUEST signal line 235 leading to the arbitrator 144, as indicated in block 352 of FIG. 3B, to signal that it wishes to gain access to the data transfer controller 152. The transmit control 209 then monitors the GRANT line 236 from the arbitrator 144, awaiting receipt of a grant signal, as indicated in blocks 353 and 354 of FIG. 3B.

At the same time that it is communicating with the arbitrator 144, the transmit control 209 instructs the DMA controller 212 to set up a DMA channel from the RAM 206 to the TDFB 208, as suggested in block 358 of FIG. 3B. The transmit control 209 awaits receipt of a signal from an input register of the TDFB 208 indicating that the TDFB 208 is not full, but is ready to receive a byte of data, as suggested in blocks 359 and 360. When the TDFB 208 is ready to receive a byte of data and an abort signal has not been received from the data transfer controller 152, the transmit control 209 instructs the DMA controller 212 to start transferring bytes of the data from the RAM 206 to the TDFB 208, as indicated in blocks 361 and 365. The DMA controller 212 then controls the transfer process to completion. The transmit control 209 then continues to monitor the ABORT line 238 and waits until the DMA controller 212 indicates that the last byte of data has been transferred from the RAM 206 and that the transfer process is at an end, as suggested in blocks 366–368.

Returning to consideration of the block 353, when the data links 132 are idle, the arbitrator 144 selects one of the network interfaces 118-119 whose REQUEST lines 235 are asserted, for example the network interface 119, and the arbitrator 144 asserts the GRANT signal line 236 leading to the network interface 119 to grant it access to the data transfer controller 152.

The transmit control 209 responds to the grant signal by assuming transmit state 302, as shown in FIG. 3A. In this state the transmit control 209 enables the TDFB 208 to transfer its contents to the data transfer controller 152 over the TRANSMIT DATA bus 234, as indicated in block 355. The data transfer from the TDFB 208 to the data transfer controller 152 is henceforth controlled by the data transfer controller 152 via the DATA ACCEPT line 237 which loops through the transmit control 209 into the TDFB 208. The transmit control 209 also inactivates, deasserts, the REQUEST line 235, as indicated in block 356.

The data is transferred across the TRANSMIT DATA bus 234 in parallel form a byte at a time. The data comprise the destination address, source address, and the message. The length of the message may vary.

Returning to consideration of block 365, data transfer from the RAM 206 to the TDFB 208 may be proceeding at the same time as data transfer from the TDFB 208 to the data transfer controller 152. While the former transfer is proceeding, the transfer control 209 monitors the ABORT signal line 238, as suggested in blocks 361, 367, and 370 of FIG. 3B. If for some reason the data transfer controller 152 wishes to stop the transfer of data to itself from the network interface 119, it asserts the ABORT line 238. The transmit controller 209 responds by entering abort interrupt state 303, as shown in FIG. 3B. In this state the transmit control 209 disables the TDFB 208 from transferring its contents to the data transfer controller 152, as indicated in block 357 of FIG. 3B. And, as indicated in block 362, at the same time the transmit control 209 issues an interrupt to the microprocessor complex 204, via the interrupt controller 205, to inform the complex 204 of the abort and enable it to take appropriate action as required by the protocol. The transmit control 209 then awaits receipt of an interrupt acknowledge from the microprocessor complex 204, as indicated in blocks 363 and 364, via a signal from the address decoder 203. Upon receipt of the interrupt acknowledge signal, the transmit control 119 returns to the idle state 300, as shown in FIG. 3A.

If an abort signal is not received from the data transfer controller 152, when the DMA controller 212 completes the process of transferring bytes of data from the RAM 206 to the TDFB 208, it sends an end-of-process signal to the transmit control 209. The transmit control 209 responds by going into completion interrupt state 304, as shown in FIG. 3A. In this state the transmit control 209 awaits receipt of a signal from an output register of the TDFB 208 indicating that the last byte is being transferred from the TDFB 208 to complete the transfer to the data transfer controller 152, as suggested in block 369 of FIG. 4B. The transmit control 209 also continues to monitor the ABORT signal line 238, as indicated in blocks 370 and 371. Upon receipt of the end-of-process signal from the TDFB 208, the transfer controller 209 pulses, asserts for a moment, the LAST TX BYTE line 240, as indicated in block 372, to inform the data transfer controller 152 that the data transfer is completed. Following transfer of the last byte, the transmit control 209 disables the TDFB 208 from making transfers on the TRANSMIT DATA bus 234, as indicated in block 357, and issues a completion interrupt to the microprocessor complex 204, as indicated in block 373. The transmit control 209 then awaits receipt of acknowledgment of the interrupt, as indicated in blocks 374 and 375. Receipt of the interrupt acknowledgment returns the transmit control 209 to the idle state 300, as shown in FIG. 3A.

NI Receive Control

Figure 4A:
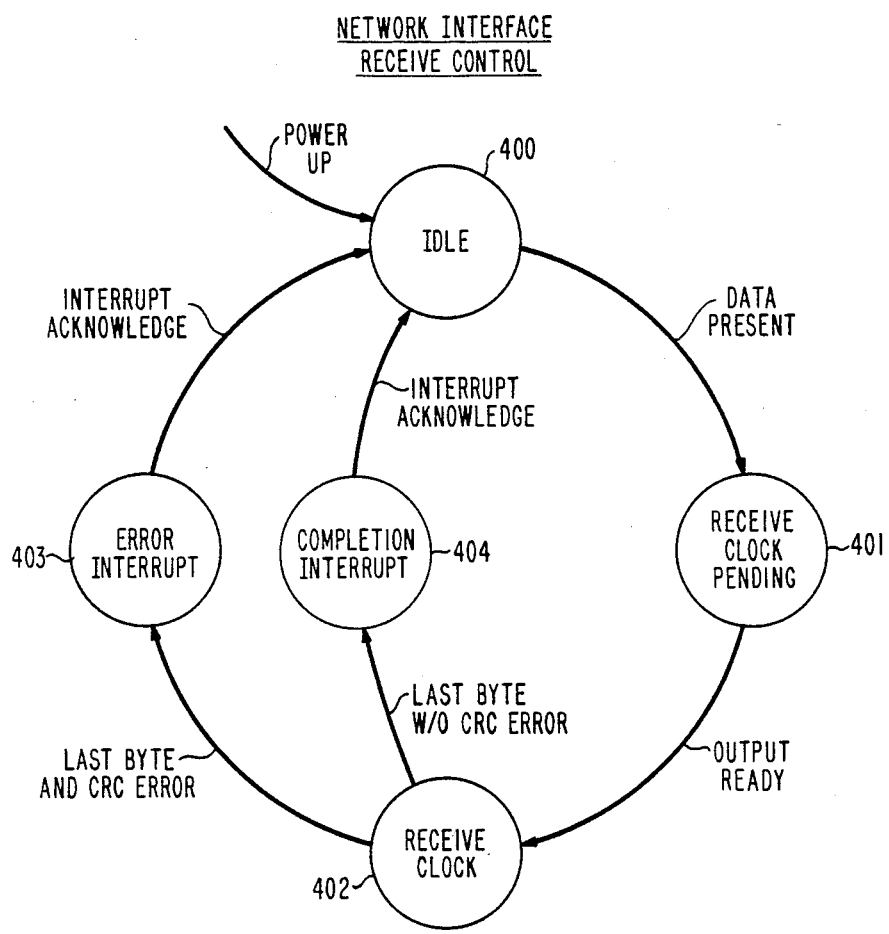

Considering next the operation of the receive control 211, reference is made to FIGS. 4A and 4B which define the circuit 211 and its operation in state diagram and logic flow diagram forms, respectively.

On power-up of the network interface 119, the receive control 211 assumes idle state 400, shown in FIG. 4A. The receive control 211 remains in the idle state 400 when data transfers from the data transfer controller 152 to the network interface 119 are not taking place. In this state the receive control 211 monitors the REC CLOCK signal line 241, awaiting receipt thereon of a signal indicating presence of data in the RDFB 210, as suggested in blocks 450 and 451 of FIG. 4B.

Whenever the data transfer controller 152 presents a byte of data to the RDFB 210 over the RECEIVE DATA bus 233, it pulses the REC CLOCK signal line 241, which loops through the receive control 204 into the RDFB 210, to load the byte of data into the RDFB 210. The receive control 211 senses the first pulsing of the REC CLOCK line 241, and responds by entering receive clock pending state 401, as shown FIG. 4A. In this state the receive control 211 instructs the DMA controller 212 to set up a DMA channel from the RDFB 210 to the RAM 206, as suggested in block 452. The receive control 211 then awaits receipt of a signal from an output register of the RDFB 210 indicating that the RDFB 210 is ready to transmit a byte of data on the NI DATA bus 232, as indicated in blocks 453 and 454.

When the receive control 211 receives indication that the RDFB 210 is ready to transmit a byte of data, it responds by assuming receive clock state 402, as shown in FIG. 4A. In this state the receive control 211 instructs the DMA controller 212 to start transferring bytes of the data from the RDFB 210 to the RAM 206, as indicated in block 455 of FIG. 4B. The DMA controller 212 then controls the transfer process to completion. The receive control 211 then awaits receipt of a signal on the LAST REC BYTE 243, indicating that the data transfer controller 152 has sent the last byte of the sequence of bytes, i.e., of a message, and that the transfer process from the data transfer controller 152 is at an end, as suggested in blocks 456 and 457.

When the last byte signal is received, the receive control 211 checks the CRC ERROR line 242 for an indication that the data transfer controller 152 has detected an error in the data that it has just completed sending to the network interface 119, as indicated in block 458. If indication of a CRC error is present, the receive control 211 responds by entering error interrupt state 403, as shown in FIG. 4A. In this state the receive control 211 sends an error interrupt signal to the microprocessor complex 204, as indicated in block 459 of FIG. 4B, and awaits receipt of acknowledgment of the interrupt, as indicated in blocks 460 and 461. When the microprocessor complex 204 receives the interrupt, it acknowledges it and takes steps required by the protocol to handle the error. The receive control 211 responds to the acknowledgment by returning to the idle state 400, as shown in FIG. 4A.

If existence of CRC error is not indicated in block 458 of FIG. 4B, the receive control 211 responds by entering completion interrupt state 404, as indicated in FIG. 4A. In this state the receive control 211 issues a completion interrupt to the microprocessor complex 204, as indicated in block 462 of FIG. 4B. The receive control 211 then awaits receipt of acknowledgment of the interrupt from the complex 204, as indicated in blocks 463 and 464, whereupon the receive control 211 returns to the idle state 400, as shown in FIG. 4A.

Data Transfer controller

As was mentioned previously, a data transfer controller controls the transfer of data between subtending network interfaces and a transceiver on the bus 116. In the process, a data transfer controller provides packet encoding and decoding, data buffer storage, and serial-to-parallel and parallel-to-serial conversion. It also monitors collision detect signals for transmission control, monitors carrier presence signals for packet transmission, and generates channel control signals. The just-discussed network interface 119 connects to the data transfer controller 152, and since all of the data transfer controllers 150-152 are substantially identical, discussion of the representative controller 152 will suffice, it being understood that the discussion applies to the other controllers 150-151 as well.

Figure 5:
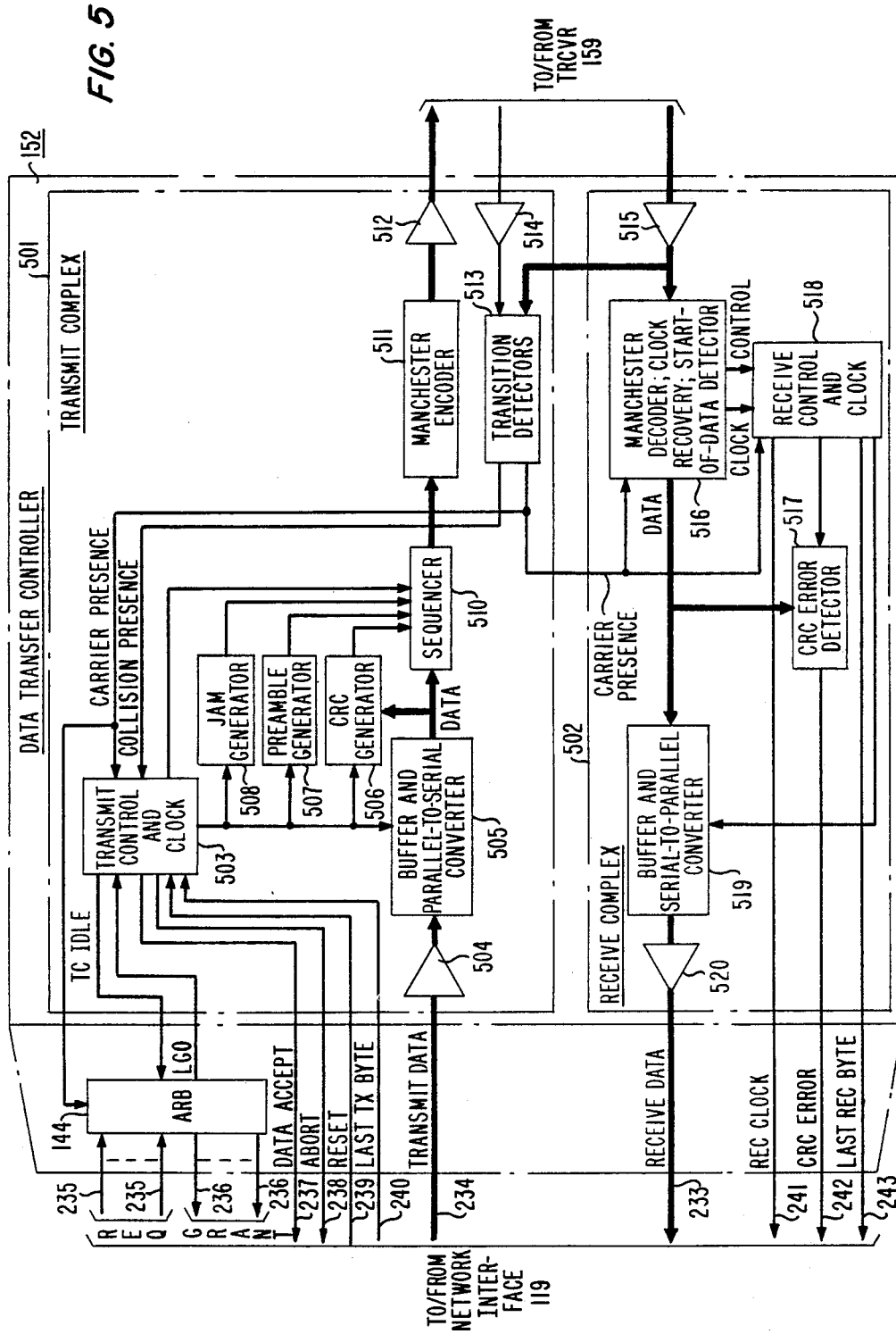
FIG. 5 is a block diagram of a data transfer controller of FIG. 1.

The data transfer controller 152 is illustrated in block form in FIG. 5. The controller 152 comprises two substantially independent portions: a transmit complex 501 and a receive complex 502. The receive complex 502 receives packets from the transceiver 159, extracts data therefrom, and transfers the data to the network interfaces 118-119. The transmit complex 501 receives data from the network interfaces 118-119, forms packets that include the data, and transfers the packets to the transceiver 159. Being substantially independent, the two complexes 501 and 502 will be discussed separately, beginning with the transmit complex 501.

DTC Transmit Complex

The component elements of the transmit complex 501 and their functions are as follows:

An arbitrator 144 is associated with the transmit complex 501. The arbitrator 144 is a conventional circuit. It receives requests to transmit across REQUEST lines 235 from network interfaces 118-119 subtending the data transfer controller 152, and it grants permission to transmit to only one network interface 118-119 at a time, via GRANT lines 236. The arbitrator 144 is enabled to send a grant signal to a network interface 118-119 only when a TC IDLE signal line from a transmit control and clock 503 indicates that the transmit complex 501 is idle and a CARRIER PRESENCE signal line from transition detectors 513 indicates that the bus 160 is idle. The arbitrator 144 gives indication to the transmit control and clock 503 that a grant signal has been given by asserting an LGO signal line.

Receivers 504, one associated with each line of the TRANSMIT DATA bus 234 leading to the network interfaces 118-119, amplify the parallel bits of data of a data byte being transferred from the network interface 119 and transfer the data into a buffer and parallel-to-serial converter 505. The receivers 504 are conventional circuits.

As its name implies, the buffer and parallel-to-serial converter 505 receives the parallel bits of data from the receivers 504, stores the data bits, and upon command from the transmit control and clock 503 outputs them in serial form to a CRC generator 506 and a sequencer 510. The circuit 505 is made up of conventional FIFO buffer and shift register circuits.

A conventional CRC generator 506 receives the data bits from the buffer and parallel-to-serial converter and generates a CRC code as a function of the data bit values. On command from the transmit control and clock 503, the CRC generator 506 sends the CRC error code to a sequencer 510. The CRC code is appended to each packet to allow detection of transmission errors at the packet receiving site.

A conventional preamble generator 507 generates the bit sequence that forms the preamble of a data packet. On command from the transmit control and clock 503, the preamble generator 507 sends the preamble to the sequencer 510. The preamble is used for synchronization at the packet receiving site to enable processing of the data of the received packet.

A conventional jam generator 508 generates a predetermined bit sequence that is transmitted on the bus 160 following occurrence of a collision. The jam generator 508 sends the jam sequence to the sequencer 510 on command from the transmit control and clock 503.

The sequencer 510 is a conventional multiplexer that, under control of the transmit control and clock 503, selects one of its plurality of inputs and connects them to its output. Thus the sequencer 510 assembles a packet from the preamble, data, and CRC error code that it receives from the devices 507, 505, and 506, respectively.

The output of the sequencer 510 is connected to an input of a Manchester encoder 511, which encodes the packet bit sequence that it receives from the sequencer 510 into Manchester code, in a conventional manner.

Output of the Manchester encoder 511 is connected to an input of a driver 512 which amplifies the serial signal sequence that it receives from the encoder 511 and transmits it to the transmitter of the transceiver 159 for transmission on the bus 160.

Transition detectors 513 monitor the collision detected signal output and the receiver output of the transceiver 159. These outputs of the transceiver 159 are coupled to the transition detectors 513 by drivers 514 and 515, respectively. In response to signals sensed thereon the transition detectors generate signals on a COLLISION PRESENCE signal line and a CARRIER PRESENCE signal line, respectively, that are utilized to inhibit, defer, and restart packet transmission. The COLLISION PRESENCE line forms an input to the transmit control and clock 503. The CARRIER PRESENCE line forms an input to transmit control and clock 503, the arbitrator 144, and the receive complex 502.

As has become apparent by now, the transmit control and clock 503 forms the intelligence of the transmit complex 501. The transmit control and clock 503 controls the operation of the various elements of the transmit complex 501 in converting bytes of data received from a network interface 118-119 into a packet and in transmitting on the bus 160 the serial stream of signals forming the packet on the bus 160. The transmit control and clock 503 carries on communications with the network interfaces 118-119 over the signal lines 237-240. The transmit control and clock 503 includes a conventional clock circuit which is a source of timing signals for the operation of the transmit complex 501 and a sequential logic circuit that is defined by the functional diagrams of FIGS. 6A and 6B.

DTC Transmit Control and Clock

Figure 6B:
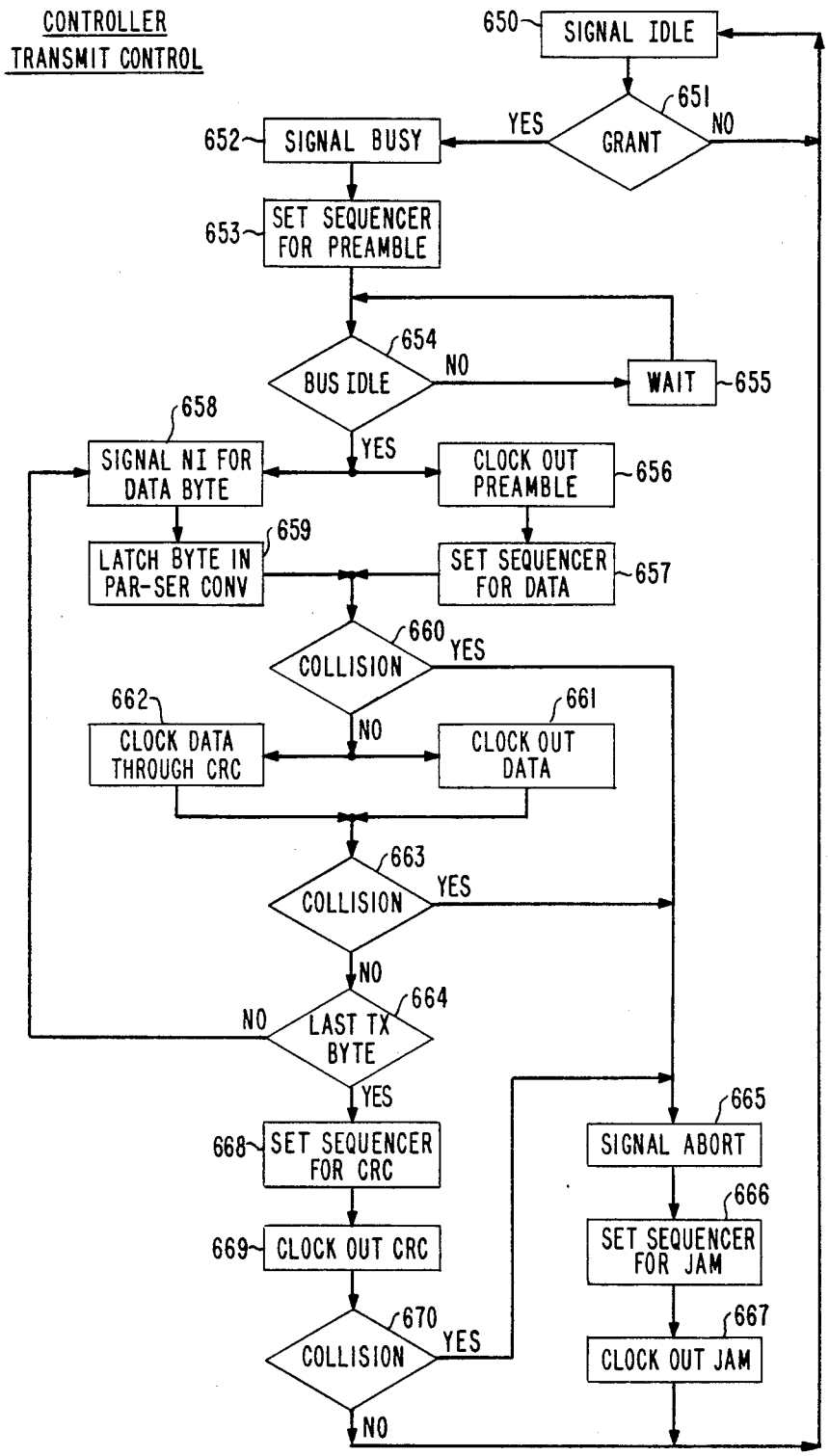

Considering now the operation of the transmit control and clock (TCC) 503, reference is made to FIGS. 6A and 6B, which define the circuit 503 and its operation in state diagram and logic flow diagram forms, respectively.

Initially, such as on power-up, the TCC 503 is sent into idle state 600 by a reset signal generated on the RESET line 239 by a network interface 118-119, as shown in FIG. 6A. In this state the TCC 503 signals the arbitrator 144 over the TC IDLE line that the transmit complex 501 is idle, as indicated in block 650 of FIG. 6B, while awaiting receipt of a signal on the LGO line from the arbitrator 144 indicating that a selected network interface 118-119 has been granted access to the transmit complex 501, as indicated in block 651.

The TCC 503 responds to receipt of a grant signal across the LGO line by assuming accept data state 601, as shown in FIG. 6A. In this state the TCC 503 signals the arbitrator 144 over the TC IDLE line that the transmit complex is busy, as indicated in block 652 of FIG. 6B. The TCC 503 also sets the sequencer 510 for transferring output of the preamble generator 507 to the Manchester encoder 511, as suggested in block 653. The TCC 503 then checks the CARRIER PRESENCE line to determine if the bus 160 is idle, as indicated in block 654. If the bus 160 is not idle, the TCC 503 waits for it to become idle, as indicated in block 655.

When the bus 160 is indicated to be idle, the TCC 503 directs the preamble generator 507 to generate a packet preamble and send it to the sequencer 510, as indicated in block 656. The preamble is generated, sent to the Manchester encoder 511, and the encoded preamble is transmitted by the transceiver 159 on the bus 160. The TCC 503 then sets the sequencer 510 for connecting the output of the buffer and parallel-to-serial converter 505 to the input of the Manchester encoder 511, as indicated in block 657.

At the same time that it undertakes the activities of blocks 656-658, the TCC 503 sends a signal on the DATA ACCEPT line 237 to the network interfaces 118-119 to cause the TDFB 208 of whichever interface 118-119 received a grant signal to transfer a byte of data onto the TRANSMIT DATA bus 234, as suggested in block 659. The TCC 503 then directs the buffer and parallel-to-serial converter 505 to take the data byte from the bus 234 and store it, as indicated in block 660.

The TCC 503 monitors the COLLISION PRESENCE signal line, as indicated in block 657, and if no collision is detected following transmission of the preamble, the TCC 503 directs the buffer and parallel-to-serial converter 505 to output the data received from the selected network interface 118-119 to the CRC generator 506 and to the Manchester encoder 511, as indicated in block 661. At the same time the TCC 503 directs the CRC generator 506 to generate a CRC code for that data, as suggested in block 662.

The Manchester encoded data is transmitted by the transceiver 159 on the bus 160, and the TCC 503 monitors the COLLISION PRESENCE line to determine whether the transmission resulted in a collision, as suggested in block 663. If no collision is indicated, the TCC 503 checks the LAST TX BYTE line 240 to determine if the selected network interface 118-119 has any more bytes to send, as suggested in block 664. If more bytes are forthcoming, the TCC 503 returns to block 659 to repeat the operation indicated in blocks 658-664.

If at any time the TCC 503 senses a collision signal on the COLLISION PRESENCE line, it responds by assuming abort state 602, as shown in FIG. 6A. In this state the TCC 503 sends an abort signal to the network interfaces 118-119 on the ABORT line 238, as indicated in block 665, to inform the selected interface 118-119 that its message has collided with another and that transmission must stop. The TCC 503 then directs the sequencer 510 to connect the output of the jam generator 508 to the Manchester encoder 511, as indicated in block 666 of FIG. 6B, and directs the jam generator 508 to generate a jam sequence, as indicated in block 667. The transceiver 159 transmits the jam sequence on the bus 160, and the TCC 503 returns to the idle state 600, as shown in FIG. 6A.

After a time interval, transmission of the aborted packet can be restarted when the bus 160 becomes idle. The restart attempt is governed solely by the network interface 119 whose data was involved in the collision. After a time interval, the network interface 119 will retry transmitting, by asserting the REQUEST 235 line to the arbitrator 144.

Returning to consideration of the block 664, indication that it has received the last data byte causes the TCC 503 to reassume the idle state 600, as shown in FIG. 6A. Before it does, however, the TCC 503 directs the sequencer 510 to connect the output of the CRC qenerator 506 to the Manchester encoder 511, as indicated in block 668, and directs the CRC generator 506 to output the CRC code that was generated as a function of the just-transmitted data packet, as suggested in block 669. The TCC 503 again checks for occurrence of collision, as indicated in block 670, and in the absence of collision it resumes the idle state 600.

DTC Receive Complex

Considering now the receive complex 502 of the data transfer controller 152, reference is again made to FIG. 5. The component elements of the receive complex 502 and their functions are as follows:

A receiver 515 is connected to the receiver output of the transceiver 159. The receiver 515 amplifies signals received from the transceiver 159 and transfers the signal stream to the Manchester decoder, clock recovery, and start-of-data detector 516, and to transition detectors 513 of the transmit complex 501.

The Manchester decoder, clock recovery, and start-of-data detector 516 is activated by carrier presence signals on the CARRIER PRESENCE line. The detector 516 receives the incoming signal stream, conventionally decodes it from Manchester encoded format into a conventional baseband signal stream, and extracts therefrom in a conventional manner a clock signal for use in synchronizing the operation of the receive complex 502 with the incoming signal stream. The incoming signal stream represents a packet, including a preamble. The clock signal is extracted from the preamble and the preamble is then stripped from the packet, prevented from propagating further. The rest of the packet is allowed to pass through the detector 516 to a CRC error detector 517 and a buffer and serial-to-parallel converter 519. When the detector 516 senses that reception of preamble has ceased and reception of the data portion of the packet has started, it generates a control signal indicative thereof. The clock and control signals are sent on CLOCK and CONTROL signal lines, respectively, to a receive control and clock 518.

The CRC error detector 517 receives the serial stream of data signals from the detector 516 and computes a CRC code as a function thereof, in a conventional manner. If the result indicates that an error has occurred, the CRC error detector 517 transmits an error signal to the network interfaces 118-119 on the CRC ERROR line 242.

The buffer and serial-to-parallel converter 519 also receives the serial bit stream from the detector 516, assembles the bits into bytes, stores the bytes, and upon command from the receive control and clock 518 outputs the bytes to transmitters 520. The circuit 519 is made up of conventional FIFO buffer and shift register circuits.

The transmitters 520, one connected to each line of the RECEIVE DATA bus 233, amplify the data signals received from the buffer and converter 519 and transmit them on the RECEIVE DATA bus 233 to the network interfaces 118-119.

The receive control and clock 518 forms the intelligence of the receive complex 502. The receive control and clock 518 includes a clock circuit which is source of timing signals for the operation of the receive complex 502, and a sequential logic circuit that is defined by the functional diagrams of FIGS. 7A and 7B. The receive control and clock 518 uses the clock signal from the detector 516 to synchronize its clock with the signal stream of the incoming packet, and then controls the operation of the various elements of the receive complex 502 in converting the serial signal stream into bytes of data and in transferring the data bytes to the network interfaces 118-119 in synchronism with packet reception. The receive control and clock 518 carries on communications with the interfaces 118-119 via the signal lines 241-243.

DTC Receive Control and Clock

Considering now the operation of the receive control and clock (RCC) 518, reference is made to FIGS. 7A and 7B which define the circuit 518 and its operation in state diagram and logic flow diagram forms, respectively.

Initially, the RCC 518 is in idle state 700, as shown in FIG. 7A, wherein it is monitoring the CARRIER PRESENCE line, awaiting indication that signals are being received over the bus 160, as indicated in blocks 750 and 751 of FIG. 7B.

Reception of signals across the bus 160 at the receiver 515 causes the transition detectors 513 to generate carrier presence signals on the CARRIER PRESENCE line. The carrier presence signals activate the Manchester decoder, clock recovery, and start-of-data detector 516, which recovers a clock signal from the incoming signal stream, decodes the incoming signals from Manchester format, and strips the packet preamble. The carrier presence signals also send the RCC 518 into synchronize state 701, as shown in FIG. 7A. In this state the RCC 518 synchronizes output of its clock circuit with the clock signal that has been recovered by detector 516 from the incoming signal stream and sent to the RCC 518 over the CLOCK line, as suggested in block 752. The RCC 518 continues to monitor the CARRIER PRESENCE line, as suggested in block 753. Loss of carrier presence signals while the RCC 518 is in the synchronize state 701 causes the RCC 518 to return to the idle state 700, as indicated in FIG. 7A.

Following synchronization with the recovered clock signal, the RCC 518 also monitors the CONTROL line awaiting receipt of a start of a data indication from the detector 516, as indicated in block 754.

When the detector 516 detects the end of the preamble, it sends a start of data indication to the RCC 518 over the CONTROL line. The detector 516 also ceases its preamble-stripping activity and allows the received signal stream to pass to inputs of the buffer and converter 519 and the CRC error detector 517. The RCC 518 responds to the start of data signal by assuming data accept state 702, as indicated in FIG. 7A. In this state the RCC 518 enables the buffer and converter 519 to serially receive bits of the signal stream reaching its inputs, as suggested in block 755 of FIG. 7B. The buffer and converter accepts eight serial bits of input and presents them as eight parallel bits—a byte—to the transmitters on 520 for transmission the RECEIVE DATA bus 233. As indicated in block 756, the RCC 518 then pulses the REC CLOCK signal line 241 to the network interfaces 118-119 to cause their RDFBs 210 to accept and store the byte of data. At the same time as it enables the buffer and converter 519 to receive the data signal stream, the RCC 518 also enables the CRC error detector 517 to accept those data signals and commence computing a CRC code as a function thereof, as suggested in block 757.

Following processing of a byte of received data, the RCC 518 again checks the CARRIER PRESENCE line to determine if more data are being received from the bus 160, as indicated in block 758. If more data are being received, the RCC 518 remains in data accept state 702 and returns to blocks 755 and 757 to repeat the activities of blocks 755-758 for another data byte.

When no more data are being received from the bus 160, the transition detectors 513 cease generating carrier presence signals on the CARRIER PRESENCE line. In response, the detector 516 becomes idle and the RCC 518 asserts the LAST REC BYTE line 243, as indicated in block 759, to signal the network interfaces 118-119 that the last byte of the received packet has been transferred to them. The RCC 518 then assumes "indicate CRC status" state 703, as shown in FIG. 7A. In this state the RCC 518 causes the CRC error detector 517 to examine the CRC code that it has computed as a function of the received data stream to determine whether the code indicates occurrence of error in the data stream, as suggested in block 760 of FIG. 7b. If error is indicated, the CRC error detector 517 asserts the CRC ERROR line 242 to signal the network interfaces 118-119 that the received data contains an error. Optionally, since the bytes of data that were transferred to the network interfaces 118-119 include the CRC code that formed a part of the packet, the microprocessor complex 204 of the network interface for which the packet was intended can use that CRC code in an attempt to isolate the error.

Following indication by the CRC error detector 517 of the error status of the data, in block 760, the RCC 718 returns to idle state 700, as shown in FIG. 7A.

Fiber Optic Extension

As was mentioned previously, a FOX is merely interposed and connected between a data transfer controller and one or more of its subtending network interfaces to extend the distance at whicn those network interfaces may lie away from the bus 160. Substitution of a FOX for one or more of the wire data links 132 in the data channel 101 produces a configuration equivalent to that of the data channel 102. And since all of the FOXs 126–128 are substantially identical, only the representative FOX 128 of the channel 102 will be discussed herein, with the understanding that the discussion applies to tne other FOXs 126–127 as well.

Referring to FIG. 1, the FOX 128 includes a remote FOX circuit 125 and a local FOX circuit 141 interconnected for communication by a link comprising a pair of simplex optical fibers 138 and 135. An arbitrator 122 that is associated with the remote FOX circuit 125 performs the functions of network interface selection previously ascribed to the arbitrator 144 in the discussion of the data channel 101.

Information transmitted between the circuits 125 and 141 on the fibers 138 and 135 is dipulse encoded in both directions of transmission. Dipulse encoding eliminates coding restrictions on FOX 128 input information, guarantees the ability to recover clock signals from the transmitted information, and increases the signal transmission rate.

Information is transmitted on optical fibers 138 and 135 as a serial stream of bits. Within the FOX 128, between the local and remote FOX circuits 141 and 125, information is transferred in the form of frames. A frame contains a byte of packet data and three signaling bits that are used for control purposes.

Figure 9:
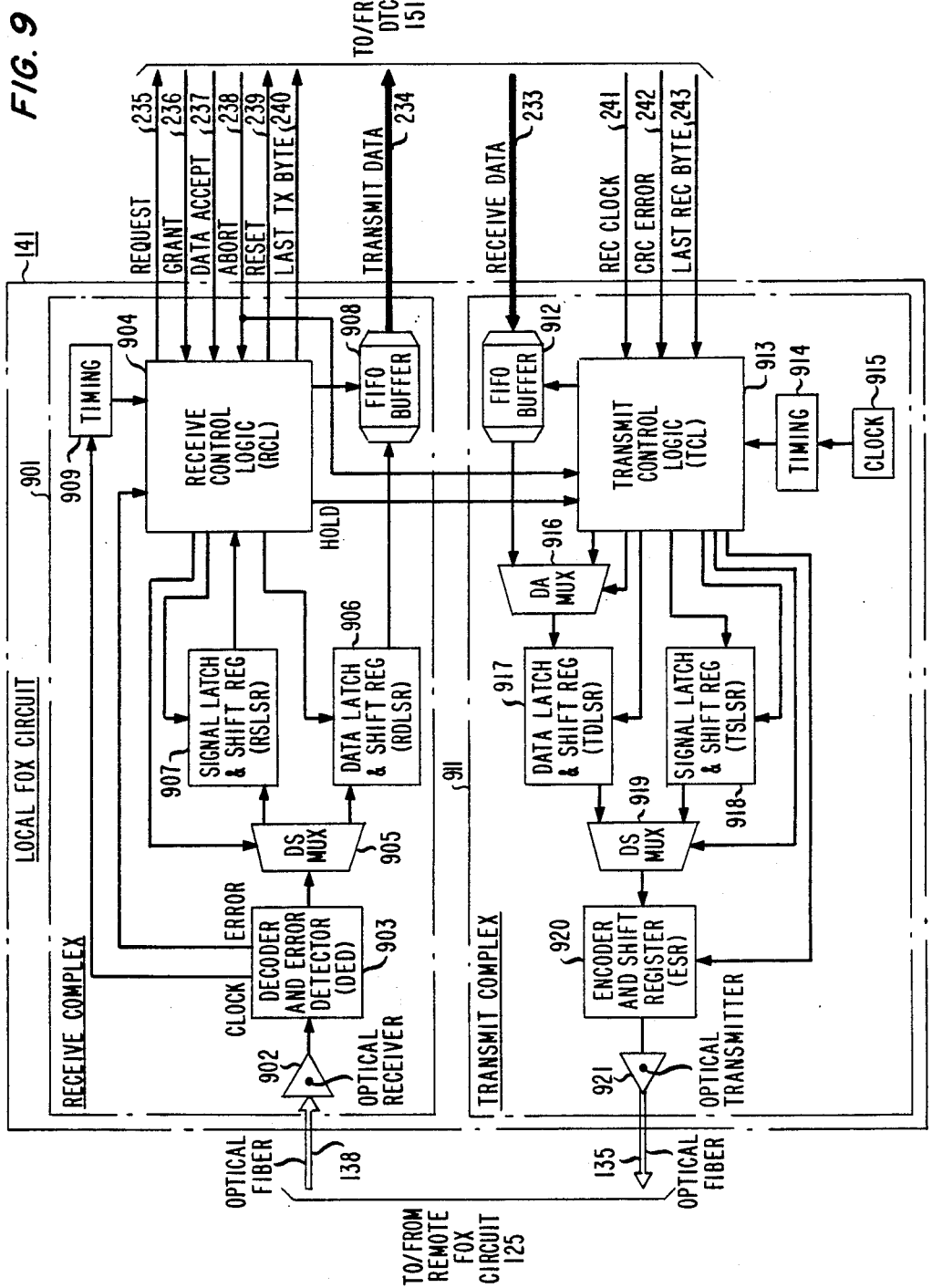
FIG. 9 is a block diagram of a local fiber optic extension circuit of FIG. 1.

The remote and local FOX circuits 125 and 141 are shown in block diagram from in FIGS. 8 and 9, respectively.

Remote FOX Circuit

Considering first the remote FOX circuit 125 shown in FIG. 8, it is divided into two functional entities—a transmit complex 801 and a receive complex 802—in direct analogy to the data transfer controller discussed previously. The remote FOX circuit 125 functionally emulates a data transfer controller to the network interfaces 116–117. Its transmit complex 801 receives bits of data in parallel, a byte at a time, across the TRANSMIT DATA bus 234 from a network interface 116–117 selected by the arbitrator 122, assembles the received data and on-board generated control signals into a frame, encodes the frame for transmission, and transmits a serial stream of dipulse encoded signals out on the optical fiber 138. The receive complex 802 receives a serial stream of dipulse encoded frame signals on the optical fiber 135, decodes the frame, disassembles the frame into data and control signals, and sends bits of the data in parallel, a byte at a time, across the RECEIVE DATA bus 233 to the network interfaces 116–117.

Structure and operation of the transmit complex 801 will be considered first.

Remote FOX Transmit Complex

As shown in FIG. 8, a FIFO buffer 804 of the transmit complex 801 is connected to the TRANSMIT DATA bus 234 to receive and store data from a selected network interface 116–117. The FIFO buffer 804 is a conventional byte-wide first-in, first-out memory. It includes an input register 805 which collects data bits from the bus 234, a storage 806 comprised of registers which can store a plurality of bytes of data and into which the input register 805 loads collected data a byte at a time, and an output register 807 for unloading data a byte at a time from the storage 806. Functions of the FIFO buffer 804 are controlled by transmit control logic (TCL) 803.

A data multiplexer (DAMUX) 808 has an input port connected to the output register 807 of the FIFO buffer 804 for receiving from the FIFO buffer 804 bytes of data. A second input port of the data multiplexer 808 is connected to an output port of the transmit control logic 803 for receiving therefrom a byte of IDLE data code. The data multiplexer 808 is a conventional multiplexer. Operation of the data multiplexer 808 is controlled by the transmit control logic 803, which selectively causes the data multiplexer 808 to connect one of its input ports to its output port.

The output port of the data multiplexer 808 is connected to an input port of a data latch and shift register (TDLSR) 811. As its name implies, the TDLSR 811 comprises a conventional data latch having outputs connected to inputs of a conventional shift register. Also controlled by the transmit control logic 803, the TDLSR 811 temporarily holds a byte of data input to it and converts it from parallel bit to serial bit format for transmission to a data and signaling multiplexer 814.

A corresponding signaling latch and shift register (TSLSR) 812 also comprises serially connected conventional data latch and shift register. The TSLSR 812 receives in parallel control signals from the transmit control logic 803, temporarily holds the control signals input to it, and converts the signals from parallel bit to serial bit format for transmission to the data and signaling multiplexer (DSMUX) 814. The TSLSR 82 also operates under control of the transmit control logic 803.

The serial outputs of the TDLSR 811 and the TSLSR 812 are connected to inputs of the data and signaling multiplexer 814. The data and signaling multiplexer 814 is again a conventional multiplexer which selects, under direction of the transmit control logic 803, one of its inputs for output to an encoder and shift register (ESR) 815.

The encoder and shift register 815 comprises three functional entities a conventional dipulse encoder, a conventional shift register, and an initialization register. The dipulse encoder receives the input from the data and signaling multiplexer 814, encodes the received bit stream into dipulse format for transmission over the optical fiber 138, and outputs the encoded signals to the shift register. The initialization register is a conventional register. If holds an initialization code that is encoded in dipulse format but violates the dipulse format, i.e., contains an encoding error. As will be made clear later, the initialization code is used for FOX synchronization upon initialization. The initialization register outputs its contents to the shift register upon command from the transmit control logic 803. When clocked by the transmit control logic 803, the shift register transfers its contents to the input of an optical transmitter 816.

The transmitter 816 converts received electrical signals into light signals which it transmits on the optical fiber 138.

As was mentioned previously, the operation to the above elements of the transmit complex 801 is controlled by the transmit control logic (TCL) 803, which is responsive in its operation to the states of these elements, to inputs from the arbitrator 122, to inputs from the receive complex 802, and to inputs from a timing circuit 809. The transmit control logic 803 is defined by the state and logical flow diagrams of FIG. 10.

The timing circuit 809 generates various logic timing signals necessary for the proper sequential operation of the transmit control logic 803. It derives these timing signals from master clock signals received from a clock 810.

Remote FOX transmit control logic

Considering now the operation of the transmit control logic (TCL) 803, reference is made to FIGS. 10A and 10B-D which define the circuit 803 and its operation in state diagram and logic flow diagram forms, respectively.

Upon power-up of the remote FOX circuit 125, the TCL 803 causes the initialization code contained in the initialization register of the encoder and shift register 815 to be loaded into the shift register of the encoder and shift register 815. The shift register is receiving clock signals from the TCL 803, and it clocks out its contents into the optical transmitter 816 which transmits the initialization code over the fiber 138 to the local FOX circuit 141. This is indicated in block 1000 of FIG. 10B. At the local FOX circuit 141 the initialization code is used to synchronize the operation of the local FOX circuit 141 with frames being received from the remote FOX circuit 125.

Figure 10C:
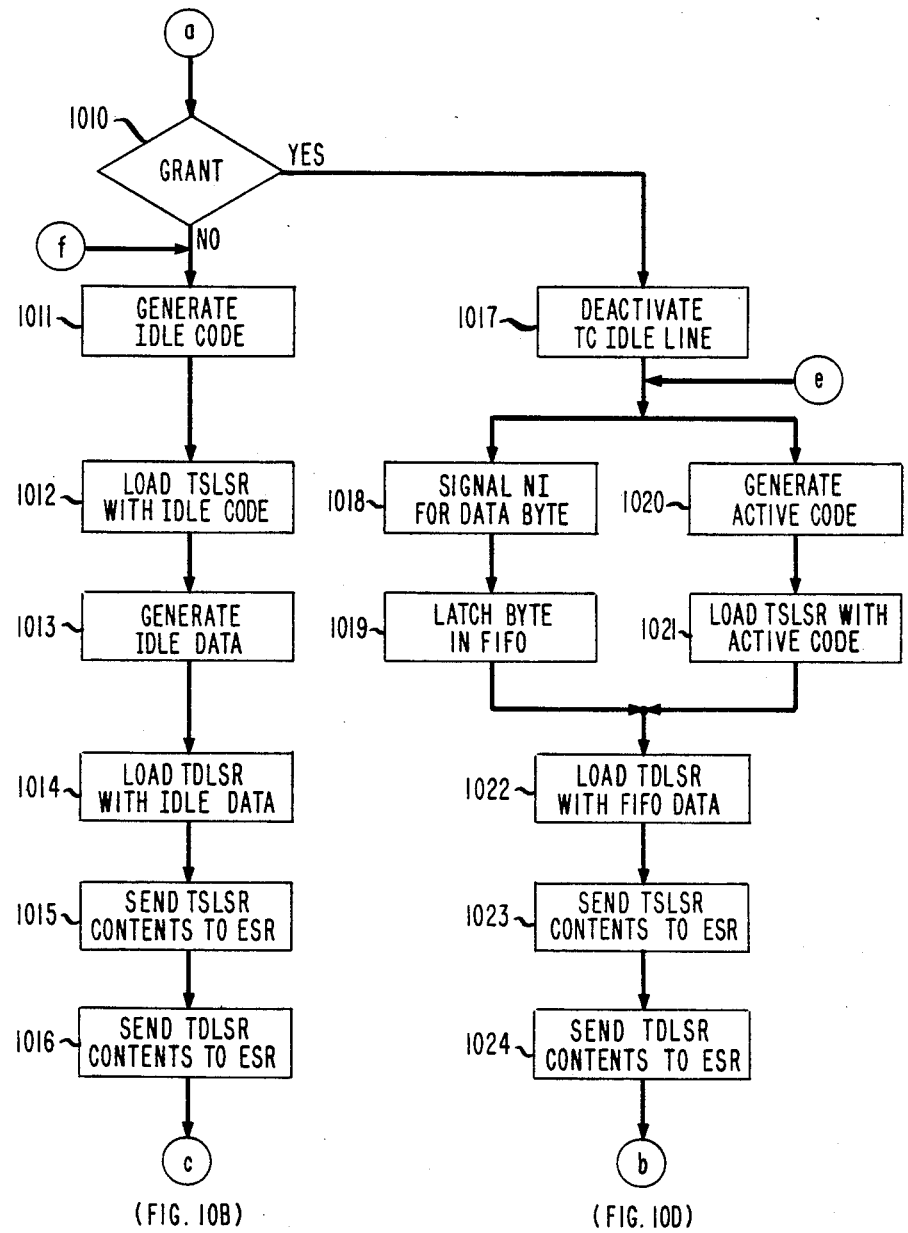
Figure 10D:
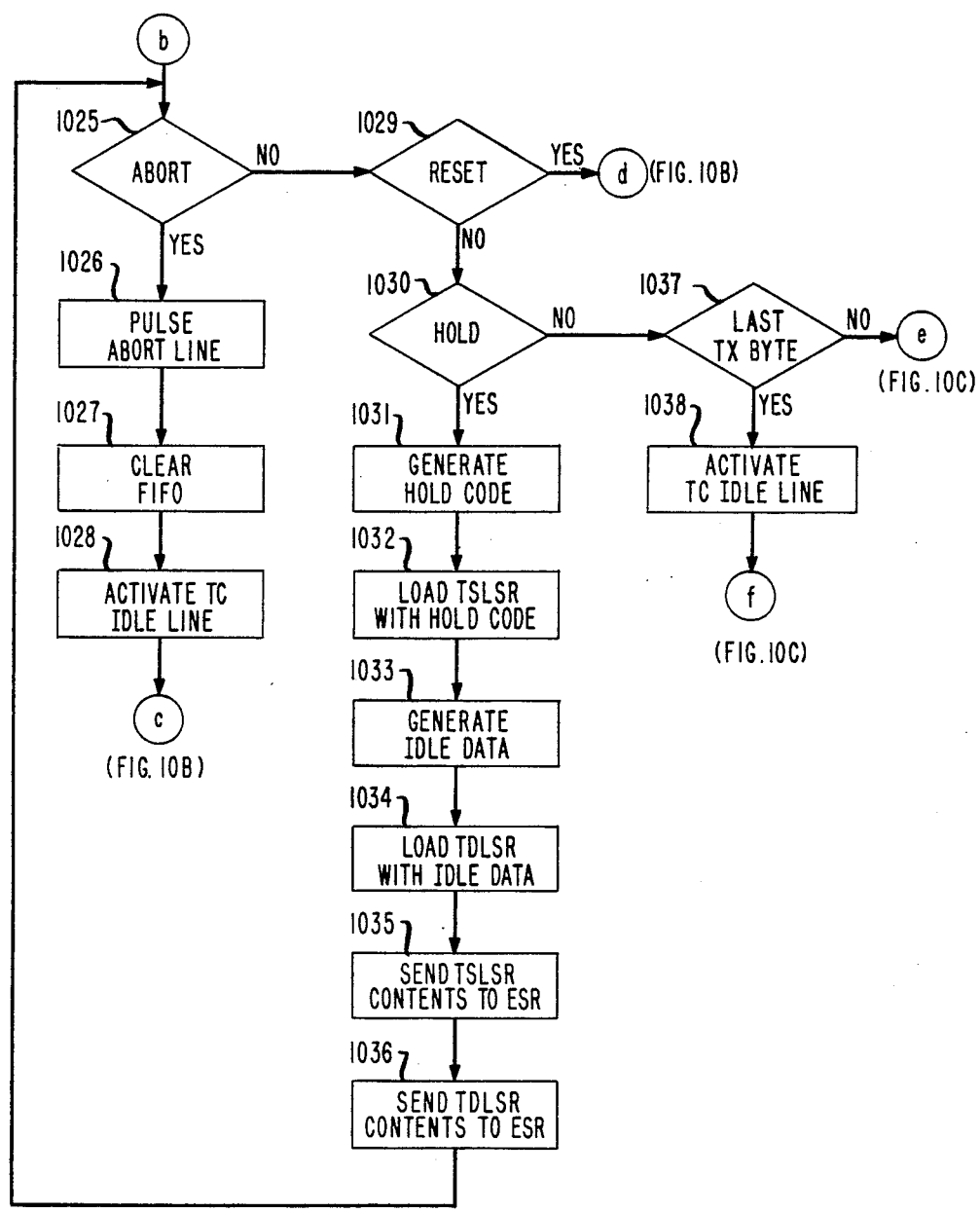

Following transmission of the initialization code, on power-up the TCL 803 assumes idle state 1050, as shown in FIG. 10A. In the idle state 1050 the TCL 803 monitors the RESET line 239 from the network interfaces 116-117 and the LGO line from the arbitrator 122 to determine if it has received a reset or a grant signal on the respective lines, as suggested in blocks 1001 and 1010 of FIGS. 10b, and 10C, respectively, or whether the transmit complex 801 is idle.

If the TCL 803 determines that the transmit complex 801 is idle, it transmits IDLE control code and IDLE data to the local FOX circuit 141, as indicated in blocks 1011-1016 of FIG. 10C. The IDLE code indicates to the local FOX circuit 141 that the remote FOX 125 has no data to send to it. The IDLE data is used to merely fill out the data portion of the frame for purposes of keeping the circuits 125 and 141 in synchronization. To accomplish the transmission, the TCL 803 first generates the IDLE code, as indicated in block 1011, and loads the IDLE code into the latch of the TSLSR 812, as suggested in block 1012. The TCL 803 also generates the IDLE data, as indicated in block 1013, sets the data multiplexer 808 to accept output from the TCL 803, and loads the IDLE data into the latch of the TDLSR 811, as suggested in block 1014. The TCL 803 also set the data and signaling multiplexer 814 to accept the output of the TSLSR 812 and causes the shift register of the TSLSR 812 to shift the bits of the IDLE code series through the data and signaling multiplexer 814 into the encoder and shift register 815, as indicated in block 1015. The TCL 803 then sets the data and signaling multiplexer 814 to accept the output of the TDLSR 811 and causes the shift register thereof to shift out the IDLE data to the encoder and shift register 815, as indicated in block 1016. The IDLE code and data are encoded into dipulse format by the encoder of the encoder and shift register 815 and are clocked out to the optical transmitter 816 by the shift register of the encoder and shift register 815.

Following transmission of the IDLE code and data, the TCL 803 returns to check again the RESET and LGO lines, at the blocks 1001 and 1010 of FIGS. 10B and 10C, respectively.

If the TCL 803 receives a reset signal on the line 803, as indicated in block 1001, it generates a RESET code, as indicated in block 1004, and transmits this code, along with IDLE data, to the local FOX circuit 141 in manner analogous to that described for blocks 1012-1016, as shown in blocks 1005-1009. At the same time the TCL 803 activates the TC IDLE line, as indicated in block 1002, to indicate to the arbitrator 122 that a network interface 116-117 may be granted access to the transmit complex 801. The TCL 803 also clears the FIFO buffer 804 of all contents, as indicated in block 1003.

Following the above-described response to the reset signal, the TCL 803 returns to check again the RESET and LGO lines, at the blocks 1001 and 1010.

If the TCL 803 receives a grant signal on the LGO line, as indicated in block 1010, it responds by assuming active state 1051, as shown in FIG. 10A. As indicated in block 1017 of FIG. 10C, the TCL 803 deactivates the TC IDLE line to indicate to the arbitrator 122 that the transmit complex 801 is busy. The TCL 803 then pulses the DATA ACCEPT line 237 to signal the network interface 116-117 that has grant of access to the transmit complex 801 to send a byte of data thereto, as suggested in block 1018. And the TCL 803 sends control signals to the FIFO buffer 804 to cause it to accept the byte of data from the TRANSMIT DATA bus 234 and to store it, as suggested in block 1019.

While obtaining data from the selected network interface 116-117, the TCL 803 generates an ACTIVE code and loads it into the TSLSR 812 in a manner analogous to that described for blocks 1011-1012, as shown in blocks 1020-1021.

Having obtained data from the selected network interface 116-117, the TCL 803 loads a byte of data from the FIFO 804 into the TDLSR 811, as indicated in block 1022. To accomplish this, the TCL 803 sets the data multiplexer 808 to accept output from the FIFO buffer 804 and causes the FIFO buffer 804 to output a byte of data, through the data multiplexer 808, into the TDLSR 811. The TCL 803 then transmits the ACTIVE code and the data to the local FOX circuit 141 in a manner analogous to that described for blocks 1015-1016, as indicated in blocks 1023-1024. Following transmission of the ACTIVE code and data, the TCL 803 checks an ABORT line incoming from the receive complex 802, the RESET line 239, a HOLD line incoming from the receive complex 802, and the LAST TX BYTE line 240 from the network interfaces 116-117, as indicated in blocks 1025, 1029, 1030, and 1037, respectively.

If the TCL 803 receives an abort signal from the receive complex 802 at the block 1025, it indicates that the DTC 151 generated an abort signal. The TCL 803 responds by resuming the idle state 1050, as shown in FIG. 10A. In the process, the TCL 803 pulses the ABORT line 238, as shown in block 1026 of FIG. 10D, to advise the network interfaces 116-117 of the abort request, clears the FIFO buffer 804 of its contents, as indicated in block 1027, to ready it for use by the next network interface 116-117 to gain access to the transmit complex 801, and activates the TC IDLE line, as indicated in block 1028, to indicate to the arbitrator 122 that the transmit complex 801 is idle. The TCL 803 then returns to checking the RESET line 239 and the LGO line, at the blocks 1001 and 1010.

If the TCL 803 receives a reset signal on the line 239, at the block 1029, it returns to the idle state 1050, undertaking in the process the activities of blocks 1002-1009, described above. The TCL 803 then returns to checking the RESET line 239 and the LGO line, at the blocks 1001 and 1010.

If the TCL 803 receives a hold signal from the receive complex 802, at the block 1030, it indicates that the local FOX circuit 141 has buffered a sufficient amount of data transmitted thereto by the remote FOX circuit 125 and is requesting a pause in data transmission to preclude buffer overflow. The TCL 803 responds by assuming hold state 1052, as shown in FIG. 10A. In this state the TCL 803 generates a HOLD code and transmits it along with IDLE data to the local FOX circuit 141, as shown in blocks 1031–1036. The HOLD code indicates to the local FOX circuit 141 that data transmission has been interrupted.

Following transmission of the HOLD code, the TCL 803 in the hold state 1052 repeats the checks of the ABORT, RESET, and HOLD lines, at the blocks 1025, 1029 and 1030, respectively. Receipt of an abort signal, at the block 1025, causes the TCL 803 to undertake the activities of the blocks 1026–1028 and to return to the idle state 1050. Receipt of a reset signal, at the block 1025, causes the TCL 803 to undertake the activities of the blocks 1002–1009 and to return to the idle state 1050.

If the TCL 803 does not receive a hold signal, at the block 1030, while it is in the hold state 1052, the TCL 803 resumes the active state 1051, as shown in FIG. 10A. In the active state 1051 the TCL 803 checks the LAST TX BYTE line 240, at the block 1037 of FIG. 10B.

If the TCL 803 does not receive a last byte signal on the LAST TX BYTE line 240, at the block 1037, the TCL 803 returns to the activities of blocks 1017–1024 to transmit another byte of data to the local FOX circuit 141.

If the TCL 803 receives a last byte signal on the LAST TX BYTE line 240, at the block 1037, it is caused to resume the idle state 1050, as shown in FIG. 10A. In the process the TCL 803 activates the TC IDLE line, as shown in block 1038 of FIG. 10D, to indicate to the arbitrator 122 that the transmit complex 801 is idle. The TCL 803 also transmits IDLE code to the local FOX circuit 141, as shown in blocks 1011–1016, to give thereby the last byte indication to the circuit 141. The TCL 801 then returns to checking the RESET line 239 and the LGO line, at the blocks 1001 and 1010.

Remote FOX Receive Complex

Referring again to FIG. 8, the receive complex 802 of the remote FOX circuit 125 is considered next.

Light signals transmitted by the local FOX circuit 141 are received on the optical fiber 135 by an optical receiver 818 of the receive complex 802. The optical receiver 818 converts the received light signals into electrical signals and transfers these to a decoder and error detector (DED) 819.

The decoder and error detector 819 comprises three conventional functional entities: a clock recovery circuit, a dipulse decoder, and a dipulse error detector. The dipulse error detector monitors the received coded signals for any errors that may have occurred therein during transmission from the local FOX circuit 141 and that now appear as a disturbance in the coding format. It also detects the initialization sequence transmitted by the local FOX circuit 141 upon power-up. The clock recovery circuit recovers the original timing of the coded signals from the signal stream received from the optical receiver 818, and outputs the recovered timing as a stream of clock signals. With the aid of the recovered clock signals, the dipulse decoder decodes the dipulse coded signal stream into its original form. The recovered clock signals are also input to timing circuit 828.

The decoded signal stream is transferred by the decoder and error detector 819 to the input of a data and signaling multiplexer (DSMUX) 821. The data and signaling multiplexer 821 is a conventional multiplexer which connects, under direction of the receive control logic 820, its input to one of its outputs.

One output of the data and signaling multiplexer 821 is connected to the serial input of a signaling latch and shift register (RSLSR) 823. The RSLSR 823 comprises a conventional shift register having its outputs connected to inputs of a conventional data latch. Also controlled by the receive control logic 820, the RSLSR 823 converts a bit stream of control signals received from the data and signaling multiplexer 821 from serial bit to parallel bit format and temporarily holds the control code for parallel transfer to the receive control logic 820.

A corresponding data latch and shift register (RDLSR) 822 has its serial input connected to another output of the data and signaling multiplexer 821. The RDLSR 822 also comprises serially connected conventional shift register and data latch. The RDLSR 822 receives a serial bit stream of data from the multiplexer 821, converts the data from serial to parallel bit, or byte, format, and temporarily holds the data byte for parallel transfer to a FIFO buffer 824.

The FIFO buffer 824 receives data bytes from the RDLSR 822 and stores them for transfer to the network interfaces 116–117. The FIFO buffer 824 is a conventional byte-wide first-in first-out memory. It includes an input register 827 which collects data bytes output by the RDLSR 822, a storage 826 comprised of registers which can store a plurality of bytes of data and into which the input register 827 loads collected data a byte at a time, and an output register 825 connected to the RECEIVE DATA bus 233 for unloading data a byte at a time from the storage 826 to the network interfaces 116–117. Functions of the FIFO buffer 824 are controlled by the receive control logic 820.

The control element of the receive complex 802 is the receive control logic (RCL) 820. It is responsive in its operation to control inputs received from the local FOX circuit 141 and to timing signals from a timing circuit 828. The receive control logic 820 also sends control signals to the network interfaces 116–117 and to the transmit control logic 803 of the transmit complex 801.

The timing circuit 828 generates various logic timing signals necessary for proper sequential operation of the receive control logic 821. The timing circuit 828 derives these timing signals from the recovered clock signals generated by the decoder and error detector 819. Remote FOX receive control logic Considering now the operation of the receive control logic (RCL) 820, reference is made to FIGS. 11A and 11B which define the circuit 820 and its operation in state diagram and logic flow diagram forms, respectively.

Upon power-up, the receive complex 802 need become synchronized with frames transmitted thereto by the local FOX circuit 141. Synchronization is accomplished by the local FOX circuit 141 transmitting to the receive complex 802 an initialization frame. This frame is equivalent to the above-described initialization frame transmitted on power-up by the transmit complex 801 to the local FOX circuit 141. The frame is received across the optical fiber 135 by the optical receiver 818, amplified, and forwarded to the decoder and error detector 819. The clock recovery circuit of the decoder and error detector 819 recovers from the frame the clock signal and outputs this signal to the timing circuit 828. The RCL 820 operation thus becomes synchronized with the received frames, and the RCL 820 is thus enabled to synchronize the operation of the other elements of the receive complex 802 with the received frames. At this point, however, the RCL 820 has no means of determining when one received frame ends and the next one begins. It therefore awaits receipt of the first dipulse error signal, as shown in block 1100 of FIG. 11B, to give it such a reference.

With the help of the recovered clock signals the decoder circuit of the decoder and error detector 819 decodes the received frame from its dipulse format. Also, the dipulse error detector circuit of the decoder and error detector 819 monitors the incoming frame for dipulse encoding format violations. It senses a violation in the initialization frame, and generates an error signal which it sends to the RCL 820.

This first error signal serves for the RCL 820 as a start, or reference, signal from which the RCL 820 is able to establish, in time, the end of one received frame and the beginning of the next received frame. The RCL 820 responds to the first error signal by assuming idle state 1150, as shown in FIG. 11A.

Upon establishing the frame start reference, the RCL 820 begins processing received frames. At the start of reception of a frame the RCL 820 causes the data and signal multiplexer 821 to establish a path from the output of the decoder and error detector 819 to the inputs of the RSLSR 823, and causes the RSLSR 823 to latch in the control code portion of a received frame, as suggested in block 1101 of FIG. 11B. Following receipt of the control code, the RCL 820 causes the data and signal multiplexer 820 to establish a path from the output of the decoder and error detector 819 to the inputs of the RDLSR 822 and causes the RDLSR 822 to latch in the data portion of the received frame, as suggested in block 1102. The RCL 820 also causes the RSLSR 823 to transfer its contents to the RCL 820, as indicated in block 1103, so that the RCL 820 may decide on the basis of the control code what to do next.

The RCL 820 examines the received control code to determine which of the possible control codes it is, as indicated in blocks 1104, 1107, 1109, 1113, 1117, and 1119.

If the received control code is HOLD 1 code, as indicated in block 1117, it indicates to the RCL 820 that the accompanying data is not IDLE data, and that the transmit complex 801 is being requested to hold up further data transmissions to the local FOX circuit 141. The RCL 820 responds thereto by assuming hold 1 state 1152, as shown in FIG. 11A. If the RCL 820 was not already in a hold state 1152 or 1153, the HOLD line leading to the transmit complex 801 is not activated, and the RCL 820 activates the HOLD line, as indicated in block 1118 of FIG. 11B, to cause the transmit complex 801 to pause data transmissions. The RCL 820 also activates an internal RECEIVING DATA indication, as shown in block 1121. This indication serves to remind the RCL 820 that it is in the process of receiving data. The RCL 820 latches the received data in the FIFO buffer 824, as indicated in block 1122. The RCL 820 does this by causing the RDLSR 822 to output the data that it is holding to the FIFO buffer 824, and by causing the input register 827 of the FIFO buffer 824 to accept that data and load it into the storage 826. The RCL 820 then signals the network interfaces 116–117 that a byte of data is being transferred to them, as indicated in block 1123, by pulsing the REC CLOCK line 241. And the RCL 820 sends control signals to the FIFO buffer 826 to cause the output register 825 to take the data byte from the storage 824 and output it on the RECEIVE DATA bus 233, as suggested in block 1124. The RCL 820 then undertakes processing of the next received data frame, at the blocks 1101–1103.

If the received control signal is ACTIVE code, as indicated in block 1119, it indicates to the RCL 820 that the accompanying data is data intended for transfer to the network interfaces 116–117. The RCL 820 responds thereto by assuming active state 1151, as shown in FIG. 11A. If the RCL 820 undergoes a transition into the active state 1151 from the hold state 1152 or 1153, the HOLD line is activated and the RCL 820 deactivates the HOLD line, as indicated in block 1120 of FIG. 11B, to cause the transmit complex 801 to resume data transmissions. Otherwise the HOLD line is already deactivated. The RCL 820 then undertakes to transfer the received byte of data to the network interfaces 116–117 in as described above for blocks 1121–1124, and thereafter returns to blocks 1101–1103 to process the next received frame.

If the received control code is HOLD 2 code, as indicated in block 1109, it indicates to the RCL 820 that the accompanying data is IDLE data not intended for transfer to the network interfaces 116–117, but that the transmit complex 801 is being requested to hold up further data transmissions to the local FOX circuit 141. The RCL 820 responds thereto by assuming the hold 2 state 1153, as shown in FIG. 11A. If the RCL 820 was not already in a hold state 1152 or 1153, the HOLD line is not activated. The RCL 820 therefore activates the HOLD line, as indicated in block 1110 of FIG. 11B, to cause the transmit complex 801 to pause data transmissions. The RCL 820 then checks if the internal RECEIVING DATA indication is activated, as indicated in block 1111. If so, it is an indication that the previous state was one in which actual data was being received, i.e., hold 1 or active, and hence that the last byte of actual data has been received. In this case the RCL 820 deactivates the RECEIVING DATA indication, as shown in block 1112, and pulses the LAST REC BYTE line 243, as indicated in block 1116, to inform the network interfaces 116–117 that they have received the last byte of data of a packet. The RCL 820 then returns to the blocks 1101–1103 to process the next received frame. If the RECEIVING DATA indication is not found to be active in the block 1111, the RCL 820 merely returns to the blocks 1101–1103.

If the received control code is IDLE code, as indicated in block 1107, it indicates to the RCL 820 that merely IDLE data are being received. The RCL 820 responds thereto by assuming the idle state 1150, as shown in FIG. 11A. If the RCL 820 undergoes transition into the idle state 1150 from hold state 1152 or 1153, the HOLD line is activated, and the RCL 820 deactivates it, as indicated in block 1108 of FIG. 11B. The RCL 820 then checks if the internal RECEIVING DATA indication is activated, as indicated in block 1111. If not, the RCL 820 merely returns to the blocks 1101-1103. If the RECEIVING DATA indication is activated, however, the RCL 820 deactivates it and pulses the LAST REC BYTE line 243, as indicated in blocks 1112 and 1116 and explained previously, before returning to the blocks 1101-1103.

If the received control code is CRC ERROR code, as indicated in block 1107, it indicates to the RCL 820 that the last byte of data of a packet has been received, and that a CRC error was detected in the packet. The RCL 820 responds by assuming the idle state 1150, as shown in FIG. 11A. If the transition into the idle state 1150 is from hold state 1152 or 1153, the HOLD line is active, and the RCL 820 deactivates it, as indicated in block 1114 of FIG. 11B. The RCL 820 then pulses the CRC ERROR line 242, as indicated in block 1115, to inform the network interfaces 116-117 of the CRC error. The RCL 820 also pulses the LAST REC BYTE line 243, as indicated in the block 1116, to advise the interfaces 116-117 of completion of data transfer. The RCL 820 then returns to the activities of blocks 1101-1103.

Finally, if the received control code is ABORT code, as indicated in block 1104, it indicates to the RCL 820 that the transmit complex 801 is being requested to abort its transmissions, and that the data accompanying the code is idle. The RCL 820 responds thereto by assuming the idle state 1150, as shown in FIG. 11A. If the RCL undergoes transition into the idle state 1150 from hold state 1152 or 1153, the HOLD line is active and the RCL 820 deactivates it, as indicated in block 1105 of FIG. 11B. The RCL 820 also pulses the ABORT line leading to the transmit control logic 803 of the transmit complex 801 to inform the logic 803 of the abort request, as suggested in block 1106. The RCL 820 then returns to the activities of blocks 1101-1103.

Local FOX Circuit

Turning now to a consideration of the local FOX circuit 141, reference is made to FIG. 9 which shows the local FOX circuit 141 in block diagram form. As can be seen from a comparison of FIGS. 8 and 9, the local FOX circuit 141 is structurally substantially the same as the remote FOX circuit 125. The local FOX circuit 141 is divided into a receive complex 901 and a transmit complex 911, which complexes parallel the complexes 802 and 801, respectively, of the remote FOX circuit 125.

Local FOX Receive Complex

Paralleling the complex 802, the receive complex 901 of the local FOX circuit 141 comprises an optical receiver 902, a decoder and error detector (DED) 903, a data and signaling multiplexer (DSMUX) 905, a data latch and shift register (RDLSR) 906, a signal latch and shift register (RSLSR) 907, a FIFO buffer 908, a timing circuit 909, and receive control logic (RCL) 904, which elements are interconnected and interact with each other in the manner described for corresponding elements of the receive complex 802 of the remote FOX circuit 125. Input of the optical receiver 902 is connected to the optical fiber 138, and output of the FIFO buffer 908 is connected to the TRANSMIT DATA bus 234 leading to the data transfer controller 151.

The main difference between the complexes 901 and 802 is in the logical operation of the receive control logic 904 and 820, respectively. The receive control logic 904 has connections via the DATA ACCEPT line 237, the LAST TX BYTE line 240, the RESET line 239, and the ABORT line 238 to the data transfer controller 151, and also has REQUEST line 235 and GRANT line 236 connections to the arbitrator 143. The logical operation of the receive control logic 904 is thus determined by the functional requirements of these connections, and by control signal inputs that it receives from the remote FOX circuit 125. The receive control logic 904 is defined by the diagrams of FIG. 12.

Local FOX Transmit Complex

Comparably, the transmit complex 911 of the local FOX circuit 141 comprises a FIFO buffer 912, a data multiplexer (DAMUX) 916, a data latch and shift register (TDLSR) 917, a signal latch and shift register (TSLSR) 918, a data and signal multiplexer (DSMUX) 919, an encoder and shift register (ESR) 920, an optical transmitter 921, a timing circuit 914, a clock 915, and transmit control logic (TCL) 913, which elements are interconnected and interact with each other in the manner described for corresponding elements of the transmit complex 801 of the remote FOX circuit 125. Output of the optical transmitter 921 is connected to the optical fiber 135 and input of the FIFO buffer 912 is connected to the RECEIVE DATA bus 233 leading from the data transfer controller 151.

The main difference between the complexes 911 and 801 is in the logical operation of the transmit control logic 913 and 803, respectively. The transmit control logic 913 has connections to the data transfer controller 151 via the REC CLOCK line 241, the CRC ERROR line 242, and the LAST REC BYTE line 243. The logical operation of the transmit control logic 913 is thus determined by the functional requirements of these connections, and by control signal inputs that are required by the remote FOX circuit 125. The transmit control logic 913 is defined by the diagrams of FIG. 13.

Local FOX receive control logic

Considering now the operation of the receive control logic (RCL) 904, reference is made to FIGS. 12A and 12B-D which define the circuit 904 and its operation in state diagram and logic flow diagram forms, respectively.

Upon power-up, the RCL 904 awaits detection by the decoder and error detector 903 of the first dipulse error, as indicated in block 1201 of FIG. 12B. Detection of the error signifies receipt from the remote Fox circuit 125 of the initialization code and allows the RCL 904, and hence the receive complex 901, to become synchronized with frames being received from the remote FOX circuit 125. Synchronization is accomplished by the RCL 904 in manner analogous to that described above for the receive control logic 820 of the remote FOX circuit 125.

Figure 12A:
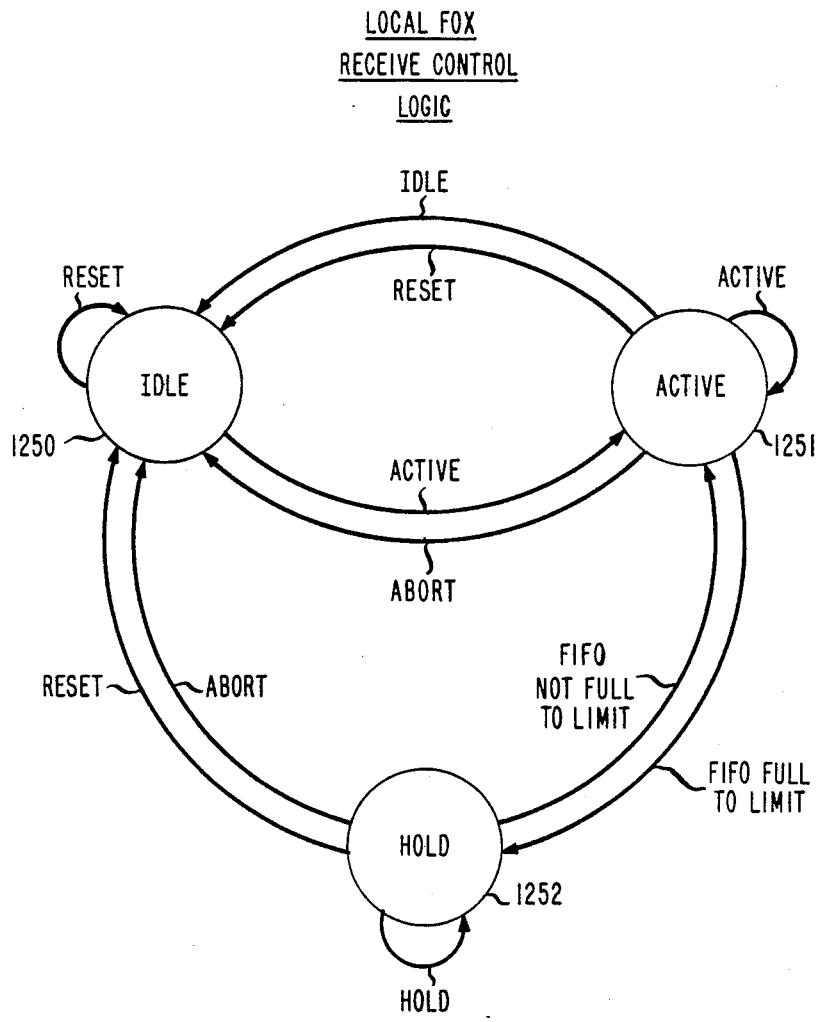

The RCL 904 responds to the first error signal by assuming idle state 1250, as shown in FIG. 12A. The RCL 904 tnen begins to process receivec frames. Frame processing is analogous to that described for the receive control logic 820 of the remote FOX circuit 125. The RCL 904 loads received control code into the RSLSR 907, as shown in block 1202 of FIG. 12B, and loads received data into the RDLSR 906, as shown in block 1203. The RCL 904 also causes the RSLSR 907 to transfer its control code contents to the RCL 904, as indicated in block 1204. And, as indicated in blocks 1205, 1206, 1211, and 1215, the RCL 904 examines the control code to determine which of the possible codes it is, so that it may respond properly thereto.

If the received control code is ACTIVE code, as indicated in block 1215, it indicates to the RCL 904 that the accompanying data is data intended for transfer to the data transfer controller 151. The RCL 904 responds thereto by assuming active state 1251, as shown in FIG. 12A. In that state the RCL 904 causes the RDLSR 906 to unload its data contents to the FIFO buffer 908, and causes the FIFO buffer 908 to store the data, as suggested in block 1216 of FIG. 12D. If the RCL 904 just made a transition into the active state 1251, an internal RECEIVING DATA indication is not activated and the RCL 904 activates that indication, as shown in block 1217. Otherwise the RECEIVING DATA indication is already activated. The RECEIVING DATA indication serves to inform other parts of the RCL 904 that data for transfer to the data transfer controller 151 is being received. Its use will be made clearer further below.

Following receipt of a byte of data, the RCL 904 checks the FIFO buffer 908 to determine whether it is full of data up to a predetermined limit, as indicated in block 1218. The limit is predetermined and set such that adequate storage capacity remains in the FIFO buffer 908 to store, without overflowing, all bytes of data that the remote FOX circuit 125 can send before receiving and responding to a hold signal issued by the RCL 904. If the FIFO buffer 908 is full to the limit, the RCL 904 assumes hold state 1252, as shown in FIG. 12A. In this state, the RCL 904 checks whether the HOLD line leading to the transmit complex 911 is activated, as shown in block 1221 of FIG. 12D. If not, the RCL 904 activates the HOLD line to cause HOLD code to be transmitted to the remote FOX circuit 125. Following activation of the HOLD line, or if the HOLD line is already activated, the RCL 904 returns to the blocks 1201-1204 to process the next received frame. Conversely, if the FIFO buffer 908 is found to not be full to the limit at the block 1218, the RCL 904 remains in or assumes the active state 1251. In this state the RCL 904 checks whether the HOLD line is activated and if so, deactivates it, as shown in blocks 1219-1220. Deactivation of the HOLD line causes transmissions of the HOLD code to the remote FOX circuit 125 to cease and causes the remote FOX circuit 125 to resume data transmissions. Following deactivation of the HOLD line, or if the HOLD line is already deactivated, the RCL 904 returns to the blocks 1202-1204 to process the next received frame.

If the received control code is HOLD code, as indicated in block 1205, it indicates to the RCL 904 that the remote FOX circuit 125 is responding to a hold signal issued by the RCL 904 by pausing data transmissions, and that the data being received is IDLE data. The RCL 904 responds to receipt of the HOLD code by returning to the blocks 1202-1204 to process the next received frame.

If the received control code is IDLE code, as indicated in block 1211, it indicates to the RCL 904 that merely IDLE data are being received. The RCL 904 responds thereto by assuming the idle state 1250, as shown in FIG. 12A. The RCL 904 checks the internal RECEIVING DATA indication, as shown in block 1212 of FIG. 12B. If the RECEIVING DATA indication is activated, it indicates to the RCL 904 that it has just made a transition from the active state 1251. This means that the last byte of data of a packet has been received by the receive complex 901. The RCL 904 deactivates the RECEIVING DATA indication, as shown in block 1213, to signal that data reception has stopped. The RCL 904 also activates an internal LAST BYTE indication, as shown in block 1214, to signal that the last byte of data has been received. Following these activities, or if the RECEIVING DATA indication was found inactivated in the block 1212, the RCL 904 returns to the blocks 1202-1204 to process the next received frame.

If the received control code is RESET code, as indicated in block 1206, the RCL 904 responds by assuming the idle state 1250, as shown in FIG. 12A. The RCL 904 clears the FIFO buffer 908 of its contents to initialize it, as indicated in block 1207 of FIG. 12B. The RCL 904 also pulses the RESET line 239, as indicated in block 1208, to cause the data transfer controller 151 to reset. And the RCL 904 deactivates the internal RECEIVING DATA and LAST BYTE indications to initialize them, as shown in block 1210. The RCL 904 then returns to the blocks 1202-1204 to process the next received frame.

Figure 12C:
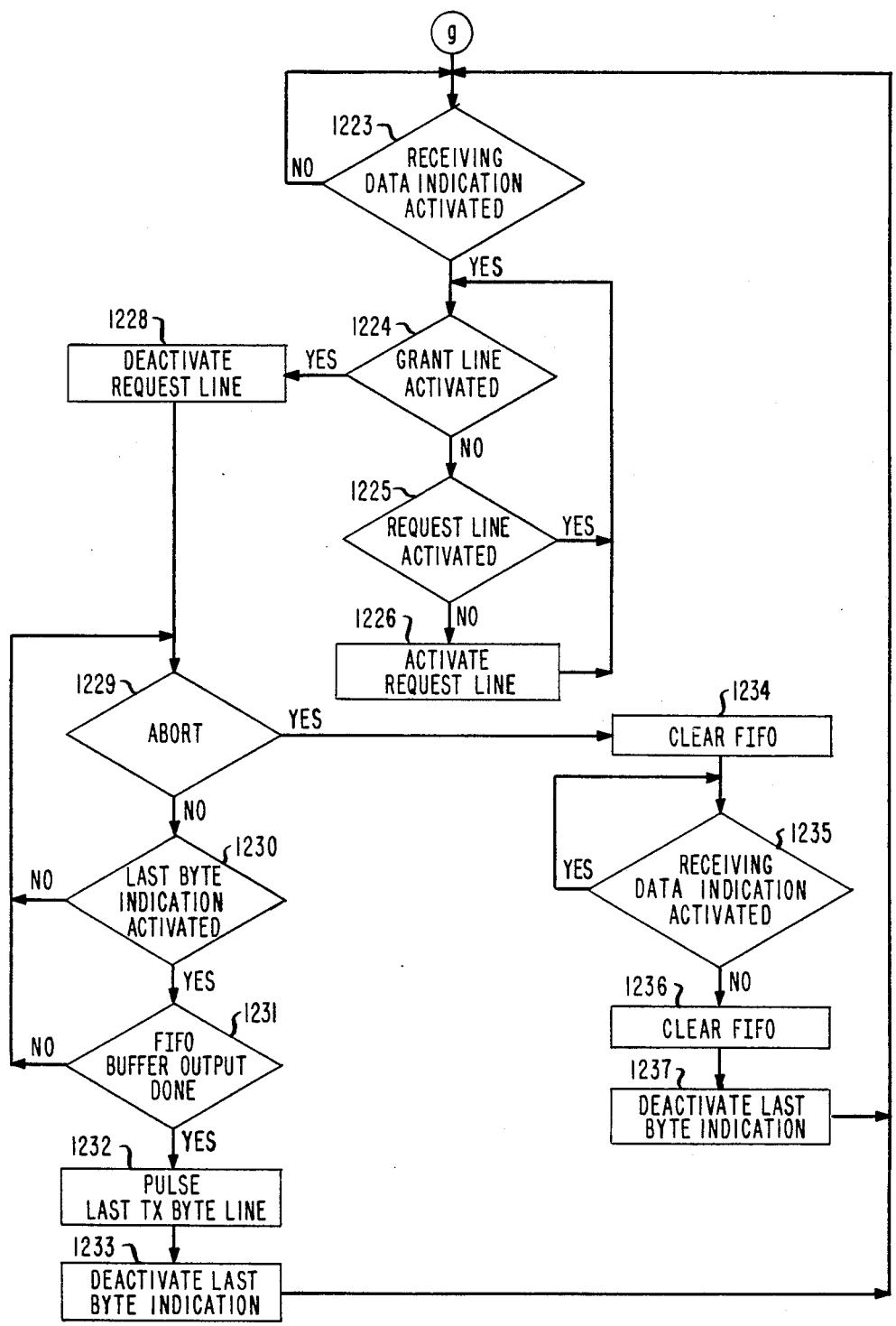

Following receipt of the initialization frame at the block 1201, while the RCL 904 is undertaking the frame processing activities of blocks 1202-1222 described above, the RCL 904 also undertakes the parallel activity of communicating with the data transfer controller 151 and its associated arbitrator 142, as indicated in blocks 1223-1237 of FIG. 12C.

In this portion of its activity the RCL 904 awaits activation of the internal RECEIVING DATA indication, as shown in block 1223. Activation of the RECEIVING DATA indication signals the RCL 904 that it has data for transfer to the data transfer controller 151. The RCL 904 responds by activating the REQUEST line 235 that connects it to the arbitrator 143, as indicated in blocks 1224-1226, and then monitors the GRANT line 236 incoming from the arbitrator 143, awaiting receipt of a grant signal, as suggested in the blocks 1224-1225.

Upon receipt of the grant signal at the block 1224, the RCL 904 deactivates the REQUEST line 235, as indicated in block 1228, and begins to monitor the ABORT line 238, as indicated in blocks 1229. While an abort signal is not received, the RCL 904 also monitors the internal LAST BYTE indication, as shown in block 1230. When that indication is activated, it signals the RCL 904 that the FIFO buffer 908 has received from the remote FOX circuit 125 the last data byte of a packet, and the RCL 904 monitors the contents of the FIFO buffer 908 to determine when the data transfer controller 151 withdraws therefrom the last byte of data, as suggested in block 1231. Upon determining that the FIFO buffer 908 has been emptied, the RCL 904 pulses the LAST TX BYTE line 240 leading to the data transfer controller 151, as shown in blocks 1232. The RCL 904 also deactivates the LAST BYTE indication, as shown in block 1233, to initialize it for the next packet. The RCL 904 then returns to monitoring the RECEIVING DATA indication at the block 1223.

If the RCL 904 senses an abort signal on the ABORT line 238 while undertaking the activities of blocks 1229-1231, it responds by clearing the FIFO buffer 908 of its contents, as shown in block 1234. The RCL 904 then monitors the RECEIVING DATA indication, waiting for it to become deactivated, as indicated in block 1235. Deactivation of that indication signals the RCL 904 that the remote FOX circuit 125 has received and responded to the ABORT code and has begun to send IDLE data. The RCL 904 clears again the FIFO buffer 908, as indicated in block 1236, to clear therefrom any data that may have been sent by the remote FOX circuit 125 before it received and responded to the ABORT code. The RCL 904 also deactivates the internal LAST BYTE indication which was activated upon receipt of IDLE code from the remote FOX circuit 125. The RCL 904 then returns to monitoring the RECEIVING DATA indication at the block 1223.

Local FOX transmit control logic

Considering now the operation of the transmit control logic (TCL) 913, reference is made to FIGS. 13A and 13B–D which define the circuit 913 and its operation in state diagram and logic flow diagram form, respectively.

Upon power-up of the local FOX circuit 141, the TCL 913 causes the initialization code contained in the initialization register of the encoder and shift register 920 to be transmitted to the remote FOX circuit 125, as indicated in block 1301 of FIG. 13B, in manner analogous to that described above for the transmit control logic 803 of the remote FOX circuit 125. The initialization code is used by the receive complex 802 of the remote FOX circuit 125 to synchronize its operation with frames being received from the local FOX circuit 141, in the manner described previously.

Following transmission of the initialization code, on power-up the TCL 913 assumes idle state 1350, as shown in FIG. 13A. In the idle state 1350 the TCL 913 monitors the REC CLOCK line 241 and the ABORT line 238 to determine if the data transfer controller 151 is generating signals on any of these lines, as suggested in blocks 1302 and 1309 of FIG. 13B, and further monitors the HOLD line from the receive complex 901 to determine if the receive control logic 904 is generating a hold signal thereon, as indicated in block 1310, or whether the transmit complex 911 is idle.

If the TCL 913 determines that the transmit complex 911 is idle, at the block 1310, it remains in or assumes the idle state 1350, as shown in FIG. 13A. In this state the TCL 913 generates IDLE control code and IDLE data and sends them to the remote FOX circuit 125 in a manner like that described for the transmit control logic 803 in conjunction with blocks 1011-1016 of FIG. 10C, as suggested by blocks 1312–1317 of FIG. 13B. The TCL 913 then returns to checking the ABORT, REC CLOCK, and HOLD lines, at the blocks 1302, 1309, and 1310.

If the TCL 913 receives an abort signal on the ABORT line 238, at the block 1302, it means that the transmit complex 801 of the remote FOX circuit 125 is being requested to abort its transmissions. The TCL 913 responds to the abort signal by leaving whatever state it may be in and assuming the idle state 1350, as shown in FIG. 10A. In the process, to convey the abort request to the remote FOX circuit 125, the TCL 913 generates and sends ABORT control code and IDLE data to the remote FOX circuit 125 in a manner analogous to that of blocks 1313–1317 of FIG. 10B, as shown in blocks 1303–1308 of FIG. 13B. The TCL 913 then returns to checking the ABORT, REC CLOCK, and HOLD lines, at the blocks 1302, 1309, and 1310.

If the TCL 913 receives a hold signal on the HOLD line while the transmit complex 911 is otherwise idle, at the block 1310, it indicates that the receive complex 901 is requesting the remote FOX circuit 125 to pause data transmissions. Since the transmit complex 911 is otherwise idle, the TCL 913 responds to the hold signal by assuming hold 2 state 1353, as indicated in FIG. 13A. To convey the hold request to the remote FOX circuit 125, the TCL 913 generates a HOLD 2 code, as indicated in block 1311 of FIG. 13B, and sends this code, along with IDLE data, to the remote FOX circuit 125, as indicated in blocks 1311 and 1313–1317. The TCL 913 then returns to checking the ABORT, REC CLOCK, and HOLD lines at the blocks 1302, 1309, and 1310.

Figure 13C:
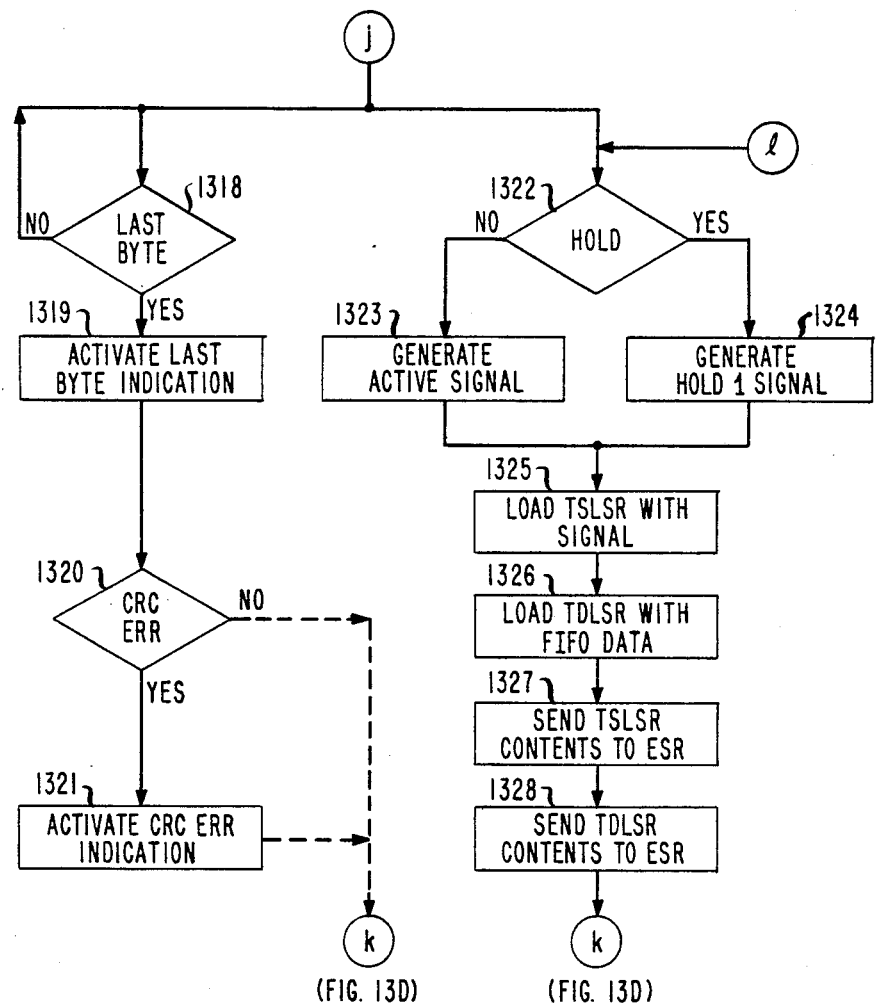

If the TCL 913 receives a clock signal on the REC CLOCK line 241, at the block 1309, indicating that the FIFO buffer 912 is receiving data from the data transfer controller 151 for transmission to the remote FOX circuit 125, the TCL 913 assumes active state 1351, as shown in FIG. 13A. In this state the TCL 913 monitors both the HOLD line and the LAST REC BYTE line 243, as indicated in blocks 1318 and 1322 of FIG. 13C.

As indicated in block 1318, the TCL 913 continues to monitor the LAST REC BYTE line 243 until it receives a last byte signal thereon. Upon receipt of that signal, the TCL 913 activates an internal LAST BYTE indication, as shown in block 1319, to record that the last byte of a packet has been received from the data transfer controller 151. The TCL 913 then checks the CRC ERROR line 242, as indicated in block 1320, to determine if a CRC Error has been detected in the received data. If a CRC error is indicated, the TCL 913 activates an internal CRC ERROR indication to record that fact, as shown in block 1321. Following detection of a last byte signal and checking of the CRC ERROR line 242, this portion of the TCL 913 activity ceases.

Returning to block 1322, the HOLD line continues to be checked by the TCL 913 throughout the active state 1351. If a hold signal is not received, the TCL 913 remains in or assumes the active state 1351 and generates an ACTIVE code, as indicated in block 1323. If a hold signal is received, the TCL 913 remains in or assumes hold 1 state, as shown in FIG. 13A, and generates a HOLD 1 code, as indicated in block 1324 of FIG. 10C. In either case the code indicates that the data which accompanies it is intended for transfer to the network interfaces 116–117.

The TCL 913 extracts a byte of data from the FIFO buffer 912 and sends it along with the code to the remote FOX circuit 125 in a manner analogous to that of the blocks 1313–1317 of FIG. 13B, as shown in blocks 1325–1328 of FIG. 13C. The TCL 913 then checks whether the internal LAST BYTE indication is activated, as shown in block 1329 of FIG. 13D. If so, the TCL 913 checks the status of the FIFO buffer 912 to determine if the transfer of data bytes from the FIFO buffer 912 to the remote FOX circuit 125 has been completed and the FIFO buffer 912 is empty, as suggested in block 1330.

If the last data byte has either not yet been received from the data transfer controller 151 or not yet been transferred to the remote FOX circuit 125, the TCL 913 checks whether an abort signal is being received, as indicated in block 1331. If an abort signal is not being received, the TCL 913 returns to the block 1322 of FIG. 13C to check the status of the HOLD line and to transfer another byte of data to the remote FOX circuit 125. If an abort signal is being received, the TCL 913 generates ABORT code and sends it, along with IDLE data, to the remote FOX circuit 125, as indicated in blocks 1332–1337, before returning to the block 1322.

If the last data byte has been received from the data transfer controller 151 and transferred to the remote FOX circuit 125, at the blocks 1329 and 1330, the TCL 913 proceeds to leave the active state 1351 or hold 1 state 1352, as shown in FIG. 13A. The TCL 913 deactivates the internal LAST BYTE indication, as shown in block 1338 of FIG. 13D, and checks the internal CRC ERROR indication, as shown in block 1339.

If CRC error is not indicated, the TCL 913 proceeds to check the HOLD line, at the block 1310 of FIG. 13B. If a hold signal is received on the HOLD line, the TCL 913 assumes the hold 2 state 1353, as shown in FIG. 13A, and sends the HOLD 2 code to the remote FOX circuit 125, as shown in blocks 1311 and 1313–1317 of FIG. 13B. If a hold signal is not received, the TCL 913 assumes the idle state 1350, as shown in FIG. 13A, and sends the IDLE code to the remote FOX circuit 125, as shown in blocks 1312–1317 of FIG. 13B. The TCL 913 then returns to checking the ABORT, REC CLOCK, and HOLD lines, at the blocks 1302, 1309, and 1310.

Figure 13D:
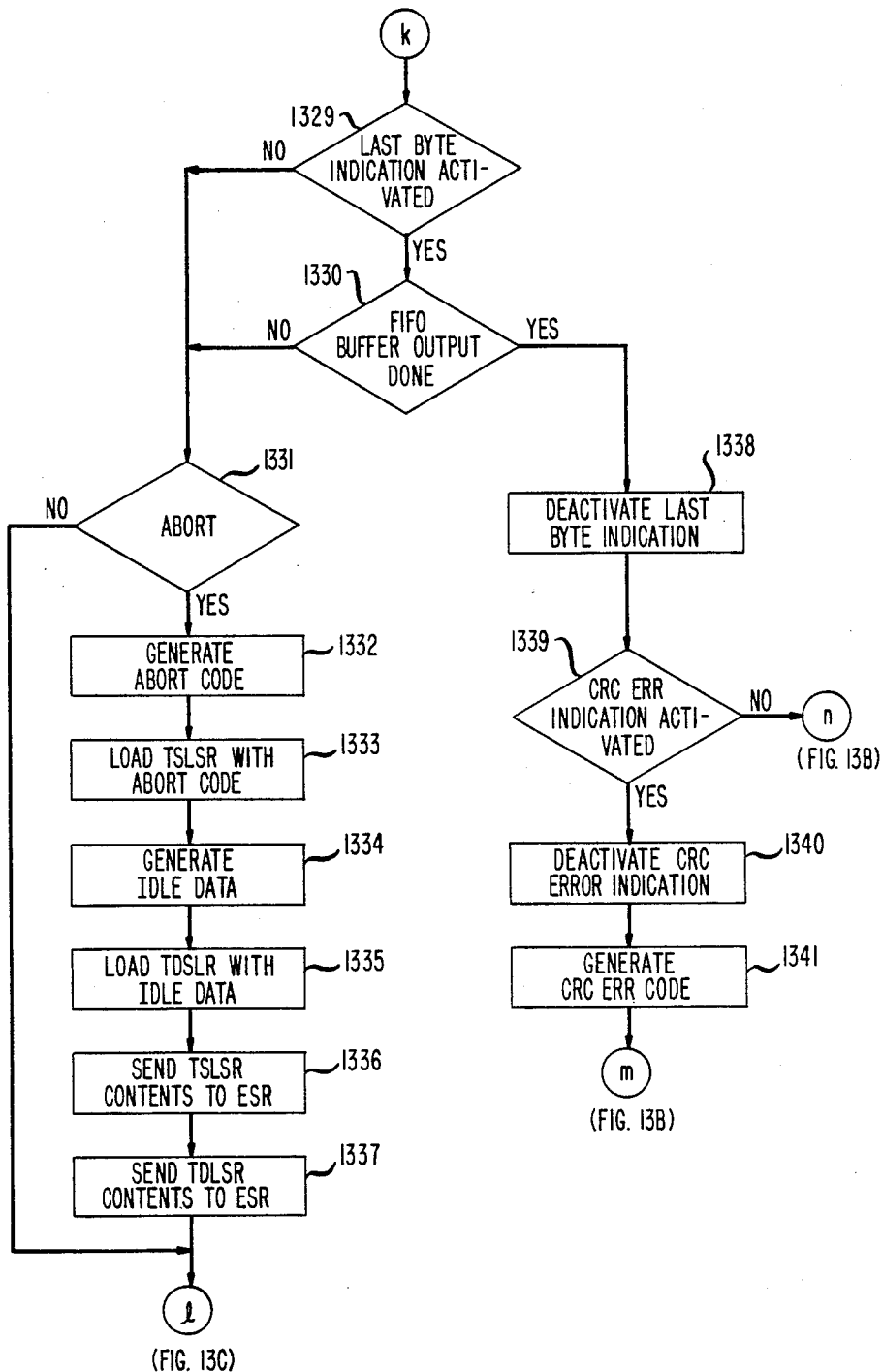

If an error is indicated by the internal CRC ERROR indicator at the block 1339 of FIG. 13D, the TCL 913 deactivates that indicator, as shown in block 1340. The TCL 913 then generates CRC ERROR control code, as shown in block 1341, and sends it to the remote FOX circuit 125, as shown in blocks 1313–1317 of FIG. 13B, before checking the ABORT, REC CLOCK, and HOLD lines at the blocks 1302, 1309, and 1310, and assuming whatever state is indicated thereby.

Of course, it should be understood that various changes and modifications to the illustrative embodiment deecribed above will be apparent to those skilled in the art. For example, extensions other than fiber optic extensions, such as electrical signal conveying extensions, may be utilized. Such changes and modifications can be made without departing from the spirit and the scope of the invention and without diminiehing its attendant advantages. It is therefore intended that such changes and modifications be covered by the following claims.

What is claimed is:

1. A communication network comprising:
    a communication medium,
    a plurality of using units interfaced to the medium for communicating thereacross; and
    an interface arrangement coupling a using unit located any distance away from the medium to the medium for communications, the interface arrangement comprising
    buffering means located at the medium and having storage capacity for temporarily storing communications of the using unit for transmission on the medium,
    control means coupled between the buffering means and the medium for communicating stored communications on the medium on behalf of the using unit according to the communication protocol of the medium,
    transferring means coupled between the using unit and the buffering means for transmitting communications of the using unit to the buffering means for transmission on the medium, the transferring means responsive to receipt of a first signal for pausing transmission of the communications to the buffering means, and
    signaling means responsive to the buffering means for sending the first signal to the transferring means when unfilled storage capacity of the buffering means decreases to a minimum at least adequate to store without overflowing communications receivable from the transferring means before the transferring means receive and respond to the first signal.

2. The network of claim 1 wherein
    the transferring means are further responsive to receipt of a second signal for resuming paused transmission of the communications to the buffering means; and wherein
    the signaling means are further for sending the second signal to the transferring means when the unfilled storage capacity increases to a minimum at least adequate to store without overflowing communications receivable from the transferring means before the transferring means receive and respond to a subsequently-sent first signal.

3. The network of claim 1 wherein
    the signaling and the control means are located at the communication medium; wherein
    the transferring means are located at the using unit; and wherein
    the interface arrangement further comprises conducting means connecting the buffering and the signaling means with the transferring means for conducting communications and signals therebetween.

4. The network of claim 1 wherein the signaling means comprise
    means for sending the first signal to the transferring means when unfilled storage capacity of the buffering means decreases to a predetermined minimum at least equal to an amount of communications transmittable by the transferring means in twice the signal travel time between the buffering means and the transferring means.

5. The network of claim 4 wherein
    the transferring means are further responsive to receipt of a second signal for resuming paused transmission of the communications to the buffering means; and wherein
    the signaling means are further cooperative with the buffering means for sending the second signal to the transferring means when the unfilled storage capacity increases to the predetermined minimum.

6. The network of claim 5 wherein the signaling means comprise
    means for determining whether the unfilled storage capacity of the buffering means has decreased or increased to the predetermined minimum; and
    means responsive to the determining means for transmitting the first or the second signal, respectively, to the transferring means when the determining means determine that the storage capacity has decreased to or increased to the predetermined minimum, respectively.

7. A communication network comprising:
    a communication medium;
    a plurality of using units interfaced to the medium for communicating thereacross; and
    an interface comprising a medium interface arrangement and a using unit interface arrangement together coupling a using unit located any distance away from the medium to the medium to interface the using unit to the medium for communicating thereacross,
    the using unit interface arrangement located at the using unit and connected to the using unit and to the medium interface arrangement for transmitting communications received from the using unit to the medium interface arrangement, the using unit interface arrangement responsive to receipt of a first signal from the medium interface arrangement for pausing transmission of the communications to the medium interface arrangement, and further responsive to receipt of a second signal for resuming paused transmission of the communications to the medium interface arrangement, the medium interface arrangement located at and connected to the medium for transmitting on the medium communications received from the using unit interface arrangement, the medium interface arrangement comprising buffering means having storage capacity for temporarily storing the communications received from the using unit interface arrangement, control means coupled between the buffering means and the medium for communicating stored communications on the medium on behalf of the using unit according to the communication protocol of the medium, signaling means responsive to the buffering means for sending the first signal to the using unit interface arrangement when unfilled storage capacity of the buffering means decreases to a minimum at least adequate to store without overflowing communications receivable from the using unit interface arrangement before the using unit interface arrangement receives and responds to the first signal and for sending the second signal to the using unit interface arrangement when the unfilled storage capacity increases to a minimum at least adequate to store without overflowing communications receivable from the using unit interface arrangement before the using unit interface arrangement receives and responds to a subsequently-sent first signal.

8. The network of claim 7 wherein the signaling means comprise means for sending the first signal to the using unit interface arrangement when unfilled storage capacity of the buffering means decreases to a predetermined minimum at least equal to an amount of communications transmittable by the using unit interface arrangement in twice signal travel time between the using unit interface arrangement and the medium interface arrangement, and for sending the second signal to the using unit interface arrangement when the unfilled storage capacity increases to the predetermined minimum.

9. The network of claim 7 wherein the interface further comprises optical fiber means interconnecting the medium interface arrangement with the using unit interface arrangement for conducting communications and signals therebetween.

10. The network of claim 7 wherein the signaling means comprise means for determining whether the unfilled storage capacity of the buffering means has decreased or increased to a predetermined minimum; and means responsive to the determining means for transmitting the first or the second signal, respectively, to the using unit interface arrangement when the determining means determine that the storage capacity has decreased or increased, respectively, to the predetermined minimum.

11. The network of claim 10 wherein the control means comprise medium transmission control means for transmitting stored communications on the medium; and medium reception control means for receiving on the medium communications for the using unit.

12. The network of claim 11 wherein the using unit interface arrangement comprises a first transmitting unit coupled between the medium interface arrangement and the using unit for transmitting communications including communications received from the using unit to the medium interface arrangement, the first transmitting unit responsive to receipt of the first signal for pausing the transmission of the communications received from the using unit and transmitting a third signal indicating the pause, and further responsive to receipt of the second signal for resuming paused transmission of the communications received from the using unit and transmitting a fourth signal indicating the resumption, and a first receiving unit coupled between the medium interface arrangement and the using unit for transferring communications received from the medium interface arrangement to the using unit, the first receiving unit responsive to receipt from the medium interface arrangement of the first or the second signal for transferring the receive signal to the first transmitting unit; and wherein the medium interface arrangement comprises a second receiving unit coupled between the first transmitting unit and the medium and including the buffering means, the determining means, and the transmission control means, for storing in the buffering means communications received from the first transmitting unit and transmitting the stored communications on the medium, the second receiving unit responsive to receipt from the first transmitting unit of the third signal for ceasing to store received communications and further responsive to receipt from the first transmitting unit of the fourth signal for resuming to store received communications, and a second transmitting unit coupled between the first receiving unit and the medium and including the firstorsecond signal transmitting means and the reception control means for transmitting communications received on the medium to the first receiving unit, the second transmitting unit responsive to receipt from the determining means of the second receiving unit of the first or the second signal for transmitting the received signal to the first receiving unit.

13. The network of claim 12 wherein the interface further comprises a second controller connecting the using unit interface arrangement to the using unit for converting communications passing between the using unit interface arrangement and the using unit between a communication form used by the using unit and a communication form used by the interface.

14. A communication network comprising:

(A) a communication medium;

(B) a plurality of using units interfaced to the medium for communicating thereacross; and (C) an interface for coupling a using unit located any distance away from the medium to the medium for communicating thereacross, the interface including (1) means for conducting communications and signals, (2) a first transmitting unit located at the using unit and connected between the using unit and the conducting means for transmitting on the conducting means communications including communications received from the using unit, the first transmitting unit responsive to receipt on the conducting means of a first signal for pausing the transmission of the communications received from the using unit and transmitting on the conducting means a third signal indicating the pause, and further responsive to receipt on the conducting means of a second signal for resuming paused transmission of the communications received from the using unit and transmitting on the conducting means a fourth signal indicating the resumption, (3) a first receiving unit located at the using unit and connected between the using unit and the conducting means for transferring to the using unit communications received on the conducting means, the first receiving unit further connected to the first transmitting unit and responsive to receipt on the conducting means of the first or the second signal for transferring the received signal to the first transmitting unit, (4) a second receiving unit located at the medium and coupled to the conducting means for temporarily storing communications received on the conducting means from the first transmitting unit, the second receiving unit responsive to receipt on the conducting means of the third signal for ceasing to store received communications and further responsive to receipt on the conducting means of the fourth signal for resuming to store received communications, the second receiving unit comprising (i) buffering means coupled to the conducting means and having storage capacity for temporarily storing the received communications, (ii) means responsive to the buffering means for determining whether unfilled storage capacity of the buffering means has decreased or increased to a predetermined minimum level at least equal to an amount of communications transmittable by the first transmitting unit in twice signal travel time over the conducting means between the first transmitting unit and the second receiving unit, and generating the first or the second signal upon determination of decrease or increase, respectively, to the predetermined level, (5) a second transmitting unit located at the medium and coupled to the conducting means for transmitting on the conducting means to the first receiving unit communications received on the medium, the second transmitting unit further connected to the determining means of the second receiving unit and responsive to generation of the first or the second signal for transmitting the generated signal on the conducting means to the first receiving unit;

(6) medium transmission control means located at the medium and coupled between the second receiving unit and the medium for transmitting communications stored in the buffering means on the medium in accordance with the communication protocol of the medium; and (7) medium reception control means located at the medium and coupled between the second transmitting unit and the medium for receiving on the medium communications for the using unit and transferring the received communications to the second transmitting unit.

15. The network of claim 14 further comprising:
means located at the using unit and connected between first transmitting and the first receiving means and the using unit for converting communications passing between the first transmitting and the first receiving means and the using unit between a communication form used by the using unit and a communication form used by the first transmitting and the first receiving means.

16. An interface arrangement for a communication network having a communication medium and a plurality of using units interfaced to the medium for communicating thereacross, for coupling a using unit located any distance away from the medium to the medium for communications, the interface arrangement comprising:
buffering means for being located at the medium and having storage capacity for temporarily storing communications of the using unit for transmission on the medium;
transferring means, coupled to the buffering means and for coupling to the using unit, for transmitting communications received from the using unit to the buffering means for transmission on the medium, the transferring means responsive to receipt of a first signal for pausing transmission of the communications to the buffering means; and
signaling means responsive to the buffering means for sending the first signal to the transferring means when unfilled storage capacity of the buffering means decreases to a minimum at least adequate to store without overflowing communications receivable from the transferring means before the transferring means receive and respond to the first signal.

17. The interface arrangement of claim 16 wherein
the transferring means are further responsive to receipt of a second signal for resuming paused transmission of the communications to the buffering means; and wherein
the signaling means are further for sending the second signal to the transferring means when the unfilled storage capacity increases to a minimum at least adequate to store without overflowing communications receivable from the transferring means before the transferring means receive and respond to a subsequently-sent first signal.

18. The interface arrangement of claim 16 wherein
the signaling means are for being located at the communication medium; wherein
the transferring means are for being located at the using unit; and
the interface arrangement further comprising conducting means connecting the buffering and the signaling means with the transferring means for conducting communications and signals therebetween.

19. The interface arrangement of claim 16 further comprising:
control means, coupled to the buffering means and for coupling to the medium, for communicating stored communications on the medium on behalf of the using unit according to the communication protocol of the medium.

20. The interface arrangement of claim 16 wherein the signaling means comprise means for sending the first signal to the transferring means when unfilled storage capacity of the buffering means decreases to a predetermined minimum at least equal to an amount of communications transmittable by the transferring means in twice the signal travel time between the buffering means and the transferring means.

21. The interface arrangement of claim 20 wherein the transferring means are further responsive to receipt of a second signal for resuming paused transmission of the communications to the buffering means; and wherein the signaling means are further cooperative with the buffering means for sending the second signal to the transferring means when the unfilled storage capacity increases to the predetermined minimum.

22. The interface arrangement of claim 21 wherein the signaling means comprise means for determining whether the unfilled storage capacity of the buffering means has decreased or increased to the predetermined minimum; and means responsive to the determining means and the transferring means for transmitting the first or the second signal, respectively, to the transferring means when the determining means determine that the storage capacity has decreased to or increased to the predetermined minimum, respectively.

23. An interface arrangement for a communication network having a communication medium and a plurality of using units interfaced to the medium for communicating thereacross, for coupling a using unit located any distance away from the medium to the medium for communicating thereacross, the interface arrangement comprising:

a medium interface portion and a using unit interface portion, the using unit interface portion for being locate at the using unit and being connected to the using unit and to the medium interface portion for transmitting communications received from the using unit to the medium interface portion, the using unit interface portion responsive to receipt of a first signal from the medium interface portion for pausing transmission of the communications to the medium interface portion, and further responsive to receipt of a second signal for resuming paused transmission of the communications to the medium interface portion, the medium interface portion for being located at and connected to the medium for transmitting to the medium communications received from the using unit interface portion, the medium interface portion comprising buffering means having storage capacity for temporarily storing the communications received from the using unit interface portion, and signaling means responsive to the buffering means for sending the first signal to the using unit interface portion when unfilled storage capacity of the buffering means decreases to a minimum at least adequate to store without overflowing communications receivable from the using unit interface portion before the using unit interface portion receives and responds to the first signal and for sending the second signal to the using unit interface portion when the unfilled storage capacity increases to a minimum at least adequate to store without overflowing communications receivable from the using unit interface portion before the using unit interface portion receives and responds to a subsequently-sent first signal.

24. The interface arrangement of claim 23 wherein the signaling means comprise means for sending the first signal to the using unit interface portion when unfilled storage capacity of the buffering means decreases to a predetermined minimum at least equal to an amount of communications transmittable by the using unit interface portion in twice signal travel time between the using unit interface portion and the medium interface portion, and for sending the second signal to the using unit interface portion when the unfilled storage capacity increases to the predetermined minimum.

25. The interface arrangement of claim 23 further comprising optical fiber means interconnecting the medium interface portion with the using unit interface portion for conducting communications and signals therebetween.

26. The interface arrangement of claim 23 wherein the signaling means comprise means for determining whether the unfilled storage capacity of the buffering means has decreased or increased to a predetermined minimum; and means responsive to the determining means for transmitting the first or the second signal, respectively, to the using unit interface portion when the determining means determine that the storage capacity has decreased or increased, respectively, to the predetermined minimum.

27. The interface arrangement of claim 26 wherein the using unit interface portion comprises a first transmitting unit, for being coupled between the medium interface portion and the using unit, for transmitting communications including communications received from the using unit to the medium interface portion, the first transmitting unit responsive to receipt of the first signal for pausing the transmission of the communications received from the using unit and transmitting a third signal indicating the pause, and further responsive to receipt of the second signal for resuming paused transmission of the communications received from the using unit and transmitting a fourth signal indicating the resumption, and a first receiving unit coupled between the medium interface portion and the using unit for transferring communications received from the medium interface portion to the using unit, the first receiving unit responsive to receipt from the medium interface portion of the first or the second signal for transferring the received signal to the first transmitting unit; and wherein the medium interface portion comprises a second receiving unit for being coupled between the first transmitting unit and the medium and including the buffering means and the determining means, for storing in the buffering means communications received from the first transmitting unit and transmitting the stored communications to the medium, the second receiving unit responsive to receipt from the first transmitting unit of the third signal for ceasing to store received communications and further responsive to receipt from the first transmitting unit of the fourth signal for resuming to store received communications, and a second transmitting unit, for being coupled between the first receiving unit and the medium and including the signal sending means, for transmitting communications received from the medium to the first receiving unit, the second transmitting unit responsive to receipt from the determining means of the second receiving unit of the first or the second signal for transmitting the received signal to the first receiving unit.

28. The interface arrangement of claim 23 further comprising control means, for being coupled between the buffering means and the medium, for communicating stored communications on the medium on behalf of the using unit according to the communication protocol of the medium.

29. The interface arrangement of claim 28 wherein the control means comprise medium transmission control means for transmitting stored communications on the medium; and medium reception control means for receiving on the medium communications for the using unit.

30. The interface arrangement of claim 28 further comprising second control means, for being connected between the using unit interface portion and the using unit, for converting communications passing between the using unit interface portion and the using unit between a communication form used by the using unit and a communication form used by the interface arrangement.

31. An interface arrangement for a communication network having a communication medium and a plurality of using units interfaced to the medium for communicating thereacross, for coupling a using unit located any distance away from the medium to the medium for communicating thereacross, the interface arrangement comprising:

means for conducting communications and signals;

a first transmitting unit, for being located at the using unit and being connected between the using unit and the conducting means, for transmitting on the conducting means communications including communications received from the using unit, the first transmitting unit responsive to receipt on the conducting means of a first signal for pausing the transmission of the communications received from the using unit and transmitting on the conducting means a third signal indicating the pause, and further responsive to receipt on the conducting means of a second signal for resuming paused transmission of the communications received from the using unit and transmitting on the conducting means a fourth signal indicating the resumption;

a first receiving unit, for being located at the using unit and being connected between the using unit and the conducting means, for transferring to the using unit communications received on the conducting means, the first receiving unit further connected to the first transmitting unit and responsive to receipt on the conducting means of the first or the second signal for transferring the received signal to the first transmitting unit;

a second receiving unit, for being located at the medium and coupled to the conducting means, for temporarily storing communications received on the conducting means from the first transmitting unit, the second receiving unit responsive to receipt on the conducting means of the third signal for ceasing to store received communications and further responsive to receipt on the conducting means of the fourth signal for resuming to store received communications, the second receiving unit comprising buffering means coupled to the conducting means and having storage capacity for temporarily storing the received communications, and means responsive to the buffering means for determining whether unfilled storage capacity of the buffering means has decreased or increased to a predetermined minimum level at least equal to an amount of communications transmittable by the first transmitting unit in twice signal travel time over the conducting means between the first transmitting unit and the second receiving unit, and generating the first or the second signal upon determination of decrease or increase, respectively, to the predetermined level; and a second transmitting unit, for being located at the medium and coupled to the conducting means, for transmitting on the conducting means to the first receiving unit communications received from the medium, the second transmitting unit further connected to the determining means of the second receiving unit and responsive to generation of the first or the second signal for transmitting the generated signal on the conducting means to the first receiving unit.

32. The interface arrangement of claim 31 further comprising medium transmission control means, for being locate at the medium and coupled between the second receiving unit and the medium, for transmitting communications stored in the buffering means on the medium in accordance with the communication protocol of the medium; and medium reception control means, for being located at the medium and coupled between the second transmitting unit and the medium, for receiving on the medium communications for the using unit and transferring the received communications to the second transmitting unit.

33. The interface arrangement of claim 32 further comprising:

means, for being located at the using unit and connected between the first transmitting and the first receiving means and the using unit, for converting communications passing between the first transmitting and the first receiving means and the using unit between a communication form used by the using unit and a communication form used by the first transmitting and the first receiving means.

* * * * *

UNITED STATES PATENT AND TRADEMARK OFFICE
CERTIFICATE OF CORRECTION

PATENT NO. : 4,651,316
DATED : March 17, 1987
INVENTOR(S) : Kristin F. Kocan and George H. Simmons It is certified that error appears in the above-identified patent and that said Letters Patent is hereby corrected as shown below:

Column 35, line 20, "medium," should read --medium, and--.

Column 36, line 26, "receive" should read --received--.

Column 36, line 44, "firstorsecond" should read --first-or-second--.

Column 39, line 37, "locate" should read --located--.

Signed and Sealed this

Sixth Day of October, 1992

Attest:

DOUGLAS B. COMER

*Attesting Officer*    *Acting Commissioner of Patents and Trademarks*